(12) United States Patent
Vazhenin et al.

(10) Patent No.: US 9,621,288 B2
(45) Date of Patent: *Apr. 11, 2017

(54) METHOD AND APPARATUS FOR ESTIMATING THE CURRENT SIGNAL-TO-NOISE RATIO

(71) Applicant: Topcon Positioning Systems, Inc., Livermore, CA (US)

(72) Inventors: Nikolay Afanasievich Vazhenin, Moscow (RU); Andrey Vladimirovich Veitsel, Moscow (RU); Fedor Borisovich Serkin, Moscow (RU); Vladimir Victorovich Veitsel, Moscow (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/212,237

(22) Filed: Jul. 17, 2016

(65) Prior Publication Data
US 2016/0365935 A1     Dec. 15, 2016

Related U.S. Application Data

(63) Continuation of application No. 14/865,240, filed on Sep. 25, 2015, now Pat. No. 9,425,908.

(30) Foreign Application Priority Data

Mar. 25, 2015  (RU) .................................. 2015110604

(51) Int. Cl.
*H04B 17/336*     (2015.01)
*H04B 17/20*      (2015.01)

(52) U.S. Cl.
CPC .......... *H04B 17/336* (2015.01); *H04B 17/20* (2015.01)

(58) Field of Classification Search
CPC ....... G01R 29/26; G01S 19/21; H04B 17/309; H04B 17/336; H04B 17/345; H04B 1/7097;
(Continued)

(56) References Cited

U.S. PATENT DOCUMENTS 6,487,174 B1 * 11/2002 Mizuguchi ............. G01R 29/26
370/252
7,613,258 B2 * 11/2009 Yu ........................ H04B 1/7097
342/357.68

(Continued)

*Primary Examiner* — Vineeta Panwalkar
(74) *Attorney, Agent, or Firm* — Bardmesser Law Group

(57) ABSTRACT

Apparatus for estimating a current SNR of a signal, including an SNR estimator and an offset compensator connected in series, the offset compensator outputting the current SNR; the SNR estimator including (i) a first squaring unit, a summer, a square root unit, a first mean unit, a first subtractor, a scaling unit, a divider, a second subtractor and a decibel (dB)-recalculator, all connected in series, wherein an output of the second squaring unit is also connected to the divider; (ii) a third squaring unit connected to the first summer, and a second mean unit connected to an output of the summer at its input and to the subtractor at its output; and (iii) a correction calculator connected to the square root unit and to the second subtractor; the first squaring unit inputting an I component of the signal; and the second squaring unit inputting a Q component of the signal.

19 Claims, 16 Drawing Sheets

(58) Field of Classification Search
CPC ........ H04B 17/20; H04L 5/006; H04W 52/24; Y02B 60/50
See application file for complete search history.

(56) References Cited

U.S. PATENT DOCUMENTS

| | | | | |
|---|---|---|---|---|
| 8,054,872 | B2* | 11/2011 | Hou | G01S 19/21 370/252 |
| 8,750,359 | B2* | 6/2014 | Medles | H04B 7/0417 375/219 |
| 2005/0281358 | A1* | 12/2005 | Bottomley | H04B 1/712 375/343 |
| 2012/0236975 | A1* | 9/2012 | Yamagishi | H03G 3/3068 375/346 |

* cited by examiner

METHOD AND APPARATUS FOR ESTIMATING THE CURRENT SIGNAL-TO-NOISE RATIO

CROSS REFERENCE TO RELATED APPLICATIONS

This application is a continuation of U.S. patent application Ser. No. 14/865,240, filed on Sep. 25, 2015, which claims priority to Russian Federation Patent application No. 2015/110604 filed on Mar. 25, 2015, which are incorporated herein by reference in their entirety.

BACKGROUND OF THE INVENTION

Field of the Invention

The present invention relates to the field of digital signal receiving and processing systems and is intended for estimating the current signal-to-noise ratio.

Description of the Related Art

Estimation of a current signal-to-noise ratio at the input of the receiving device is relevant for communication and positioning radio systems and has been long the subject of engineering developments.

There are known methods and devices of estimating current signal-to-noise ratio described, for example, in patents and publications: U.S. Pat. No. 7,190,741, U.S. Pat. No. 8,368,593, U.S. Pat. No. 6,317,456, U.S. Pat. No. 8,495,480, U.S. Pat. No. 6,717,976, U.S. Pat. No. 7,032,160, U.S. Pat. No. 8,194,558, RU 2332676, RU 2414718, RU 2472167, RU 2429496, RU 2434325, RU 2446448, CN 1661996A, CN 101030787A, CN 101552752B, EP 2050214A2, as well as in patent applications: US2 0070168407, US 20070168407, US 20110188561, WO 2003085845, and so on.

U.S. Pat. No. 7,190,741, entitled "Real-Time Signal-to-Noise Ratio (SNR) Estimation for BPSK and QPSK Modulation Using the Active Communication Channel", describes a method and device for measuring the current signal-to-noise ratio for BPSK and QPSK signals. The described device includes a quadrature mixer and a unit of estimating signal-to-noise ratio. The signal-to-noise ratio is determined on the basis of measuring the angle oscillation of the vector describing the received signal.

A method of measuring signal-to-noise ratio in U.S. Pat. No. 6,317,456 includes the operations of mean, square-rooting and dividing being performed with quadrature components of the received signal. But it is intended for OFDM-modulated signals.

US Patent Publication No. 20070168407 proposes a method of measuring signal-to-noise ratio with the help of filters, which is based on a difference in spectra of the desired signal and interference; the method comprises operations of filtering, square-rooting and taking a mean (integrating) for quadrature components of the received signal.

A method of estimating small changes in values of the signal-to-noise ratio presented in WO2003085845 suggests calculating the vector length of the received signal and determining its statistical characteristics, based on which the signal-to-noise ratio is further defined.

Patent RU2472167, entitled "Digital measurer of signal and interference strength in the passband of the receiver channel in real time", describes a mixer, a band filter, ADC, multipliers, mean units, storing registers, etc. This reference describes two measuring channels: in the first channel, there is coherent processing, and in the second channel, there is incoherent processing of the received signal. However, this device does not process quadrature components of the received signal.

A method and device of estimating signal-to-noise ratio for BPSK and QPSK signals according to U.S. Pat. No. 7,190,741, entitled "Real-Time Signal-to-Noise Ratio (SNR) Estimation for BPSK and QPSK Modulation Using the Active Communication Channel", includes a separation of quadrature components of the complex envelope of the received signal, calculation of a deviation/offset angle from the in-phase axis for the signal vector and a calculation the current signal-to-noise ratio based on statistical characteristics of the angle. The device includes a quadrature mixer and units of estimation signal-to-noise ratio. However, this method and device produce considerable errors, in particular, with small signal-to-noise ratios that are connected with different distribution laws, i.e., other than the Gaussian law for quadrature components.

The objective of the present invention is to address the drawbacks of known technical solutions.

SUMMARY OF THE INVENTION

The proposed technical solution is directed to improving an accuracy of the current signal-to-noise ratio due to processing quadrature components of the received signal that always have the Gaussian distribution law in the channel with additive white Gaussian noise (AWGN), which enables applying the described algorithms in a wider signal-to-noise ratio band.

Digital radio communications systems, radars, radio navigation and so on, using BPSK-modulated signals, relate to the scope of use of the proposed technical solution.

The technical result of using the described invention is improving the accuracy of signal-to-noise estimates and widening the range of signal-to-noise ratios due to the proposed algorithms. In addition, a number of the claimed methods for estimating the signal-to-noise ratio provide a higher accuracy of estimates when a systematic angle shift of the signal vector is present.

The claimed purpose is achieved by obtaining samples of in-phase $I_Y$ and quadrature $Q_Y$ components of the complex envelope of the received signal and their further processing according to the proposed algorithms. The samples of the quadrature components can be taken both at the output of the matched filter with a pulse rate of the channel symbols and before the matched filter with the assigned sampling frequency. For the sake of clarity, we assume that samples of in-phase $I_Y$ and quadrature $Q_Y$ components of the complex envelope for the received signal are taken at the output of the matched filter with a pulse rate of the channel symbols.

A known method for estimating the current signal-to-noise ratio in receiving a sequence of BPSK-modulated symbols according to U.S. Pat. No. 7,190,741, for example, which includes a reception of an additive mixture $y(t)=s(t)+n(t)$ of the desired signal $s(t)$ in the form of a sequence of phase-modulated (BPSK, for instance) symbols of the given length, 180° $s(t)$ phase deviation, and additive white Gaussian noise (AWGN) $n(t)$ and a separation of quadrature components of the complex envelope of the received signal $I_Y$ and $Q_Y$ in the quadrature mixer.

One of the features of the proposed method is that, for a given selection duration:

the average square value of in-phase component $\overline{I_Y^2}$ is determined, where the dash above the symbol means a calculation of the average value of the corresponding parameter in time for the given selection duration, the average square value of quadrature component $\overline{Q_Y^2}$ is determined, the square of the average absolute value of in-phase component $|\overline{I_Y}|^2$ is determined, the square of the mean value of quadrature component $]\overline{Q_Y}[^2$ is determined, and the values of the quadrature component are averaged considering the sign of the received channel symbol, the current value of the absolute value (vector length) of the complex envelope $\sqrt{I_y^2+Q_y^2}$ is determined, the estimate of the current signal-to-noise ratio is determined, taking into account a combination of all or part of obtained values, a systematic error of the current signal-to-noise ratio is compensated when necessary.

In a first embodiment of the proposed method, a calculation of the current signal-to-noise ratio is implemented according to $$SNR_{dB} = 10 lg\left(\frac{|\overline{I_Y}|^2 + ]\overline{Q_Y}[^2}{\overline{I_Y^2} + \overline{Q_Y^2} - (|\overline{I_Y}|^2 + ]\overline{Q_Y}[^2)}\right).$$

In a second embodiment a calculation of the current signal-to-noise ratio is implemented according to $$SNR_{dB} = 10 lg\left(\frac{\overline{I_Y^2} - \overline{Q_Y^2} + 2]\overline{Q_Y}[^2}{2 \cdot (\overline{Q_Y^2} - ]\overline{Q_Y}[^2)}\right).$$

In a third embodiment a calculation of the current signal-to-noise ratio is implemented according to $$SNR_{dB} = 10 lg\left(\frac{|\overline{I_Y}|^2 + ]\overline{Q_Y}[^2}{2 \cdot (\overline{Q_Y^2} - ]\overline{Q_Y}[^2)}\right).$$

In a fourth embodiment a calculation of the current signal-to-noise ratio is implemented according to $$SNR_{dB} = 10 lg\left(\frac{\overline{I_Y^2} - \overline{Q_Y^2} + 2]\overline{Q_Y}[^2}{\overline{I_Y^2} + \overline{Q_Y^2} - (|\overline{I_Y}|^2 + ]\overline{Q_Y}[^2)}\right).$$

In a fifth embodiment a calculation of the current signal-to-noise ratio is implemented according to $$SNR_{dB} = 10 lg\left(\frac{\overline{\sqrt{I_y^2+Q_y^2}}^2}{2 \cdot \left(\overline{\sqrt{I_y^2+Q_y^2}^2} - \overline{\sqrt{I_y^2+Q_y^2}}^2\right)}\right).$$

In a sixth embodiment a calculation of the current signal-to-noise ratio is implemented according to $$SNR_{dB} = 10 lg\left(\frac{\overline{\sqrt{I_y^2+Q_y^2}}^2}{2 \cdot \left(\overline{\sqrt{I_y^2+Q_y^2}^2} - \overline{\sqrt{I_y^2+Q_y^2}}^2\right)}\right) - SNR_{add},$$

where $SNR_{add}$ is the correction to increase the accuracy of the SNR estimate. This correction $SNR_{add}$ being introduced for improving SNR accuracy can be calculated as follows $SNR_{add} = 4 \cdot (\overline{x^2} - \overline{x}^2) \cdot \ln(10)$ or $$SNR_{add} = 10 \cdot lg\left[\left(1 + 2 \cdot (\overline{x^2} - \overline{x}^2)\right) \cdot \left[4.7 - \frac{3}{\overline{x^2}} + 4.5 \cdot \left[\frac{\overline{x} \cdot \sqrt{\overline{x^2}}}{2 \cdot \overline{x^2}^3} - 1\right] tg\left(\frac{2 \cdot \sqrt{0.1 + \overline{x^2} - \overline{x}^2}}{1.1 + \overline{x^2}}\right)\right]\right],$$

where $x=|\vec{Y}|=\sqrt{I_Y^2+Q_Y^2}$ is the current value of the amplitude envelope of the received signal and noise, for example, at the output of the matched filter.

Another next embodiment of the claimed method differs in the calculation of the current signal-to-noise ratio, which is as follows:

$$SNR_{dB} = 10 lg\left(\frac{\overline{\sqrt{I_y^2+Q_y^2}}^2}{2\left(\overline{\sqrt{I_y^2+Q_y^2}^2} - \overline{\sqrt{I_y^2+Q_y^2}}^2\right)} - 1\right).$$

It should be noted that the fifth, sixth and seventh embodiments are based on processing vector length for the received mixture of signal and noise and can be applied to different types of multi-type multiphase modulation (MPSK), such as QPSK, 8 PSK and so on.

In the above embodiments of the method of estimating SNR, when required, quadrature component value$]Q_Y[$ should be used with the sign of the current channel symbol. In this case the use of the information from the demodulator is either impossible or unreasonable, this parameter can be determined with the current sign of in-phase component $I_Y$ in accordance with $]Q_Y[=Q_Y \cdot \text{sign}(I_Y)$, where operation $\text{sign}(I_Y)$ means determination of the current sign for in-phase component $I_Y$.

When receiving a sequence of BPSK-modulated symbols, the claimed methods of estimating the current signal-to-noise ratio can be technically implemented as the corresponding devices.

When using a correction of systematic error, a determination of a preliminarily-obtained analytical, experimental or simulating dependence of an expected value for the current SNR ratio for the given estimation method on the true SNR estimate for the given estimation method should be included. Then a calculation of the current SNR estimate for the assigned SNR estimation can be performed, and after that the obtained dependence of the expected value for the current SNR on the true current SNR value is used to compensate systematic error of the current SNR estimate.

Another embodiment of implementing the method of estimating SNR ratio using systematic error corrections includes a preliminarily-obtained analytical, experimental or simulating dependence of an expected value for the difference of the true current SNR and its estimate on the SNR estimate for the given estimation method, a calculation of the current SNR estimate for the assigned SNR estimation method, a compensation of the systematic error of the current SNR by adding the difference of the true current SNR for the given estimation method and its estimate of the current SNR estimate for the given estimation method.

With reference to the figures discussed below, a conventional instrument for measuring the current signal-to-noise ratio includes a series-connected quadrature mixer (1) and SNR estimation unit (2), the input of the quadrature mixer (1) being the input of the instrument, the outputs of the quadrature mixer (1) connected to the corresponding inputs of the SNR estimation unit (2), the output of which is the output of the instrument.

In the first embodiment of the device of the present invention, to estimate the current signal-to-noise ratio, an offset-compensation unit (3) is added, the output of which is the instrument output, and its input is connected to the output of SNR estimation unit (2), SNR estimation unit (2) being the series-connected absolute value/module calculation unit (201), the first mean unit (202), the first squaring unit (203), first summer (204), divider (209) and the dB-recalculation unit (210), the input of the absolute value calculation unit (201) being the first input of SNR estimation unit (2), the output of the squaring unit (203) is connected to the first input of the first summer (204), the output of which is connected to the first input of the divider (209), and the output of the dB-recalculation unit (210) being the output of the SNR estimation unit (2), in addition, the SNR estimation unit (2) includes series-connected sign determination unit (205), multiplier (206), the second mean unit (207), the second squaring unit (208), the input of the unit for determination sign (205) is switched to the first input of the SNR estimation unit (2), and its output—to the first input of the multiplier (206), the second input of which is connected to the second input of the SNR estimation unit (2), and the output of the second squaring unit (208) is switched to the second input of the first summer (204), besides, the SNR estimation unit (2) includes series-connected third squaring unit (211), third mean unit (212), the second summer (213) and subtraction unit (214), the input of the third squaring unit (211) is connected to the first input of the SNR estimation unit (2), the output of the third mean unit (212) is connected to the first input of the second summer (213), the output of which is connected to the first input of the subtraction unit (214), the output of which is connected to the second input of the divider (209), and the second input is connected to the output of the first summer (204), in addition, the SNR estimation unit (2) includes the series connected fourth squaring unit (215) and fourth mean unit (216), the input of the fourth squaring unit (215) is connected to the second input of the SNR estimation unit (2), and the output of the fourth mean unit (216) is connected to the second input of the second summer (213).

In the second embodiment of the device of the present invention to measure the current signal-to-noise ratio the SNR estimation unit (2) is made as series-connected first squaring unit (301), first mean unit (302), first subtraction unit (303), summer (304), divider (307) and dB-recalculation unit (308), the output of which is the output of the SNR estimation unit (2), the input of the squaring unit (301) being the first input of the SNR estimation unit (2), the output of the first mean unit (302) is connected to the first input of the first subtraction unit (303), the output of which is connected to the first input of the summer (304), the output of which is connected to the first input of the divider (307), besides, there are series-connected second squaring unit (305) and second mean unit (306), the input of the second squaring unit (305) being connected to the second input of the SNR estimation unit (2), the output of the second mean unit (306) is connected to the second input of the first subtraction unit (303) and to the first input of the second subtraction unit (314), in addition there are series-connected sign determination unit (309), multiplier (310), third mean unit (311), third squaring unit (312), first scaling unit (313), the output of which is connected to the second input of the summer (304), the input of the sign determination unit (309) being connected to the first input of the SNR estimation unit (2), and the output of the sign determination unit (309) is connected to the first input of the multiplier (310), the second input of which is connected to the second input of the SNR estimation unit (2), there are also series-connected second subtraction unit (314) and second scaling unit (315), the output of which is connected to the second input of the divider (307), and the first input of the subtraction unit (314) is connected to the output of the second mean unit (306), and the second input—to the output of the third squaring unit (312).

In the third embodiment of the device of the present invention, the SNR estimation unit is made in the form of series-connected absolute value calculation unit (401), first mean unit (402), first squaring unit (403), summer (404), divider (409) and dB-recalculation unit (410), the output of which is the output of the SNR estimation unit (2), and the input of the absolute value calculation unit (401) is connected to the first input of the SNR estimation unit (2), the output of the first squaring unit (403) is connected to the first input of the summer (404), the output of which is connected to the first input of the divider (409), there are also series-connected sign determination unit (405), multiplier (406), second mean unit (407), second squaring unit (408), subtraction unit (413) and scaling unit (414), the output of which is connected to the second input of the divider (414), and the input of the sign determination unit (405) is connected to the first input of the SNR estimation unit (2), and its output—to the first input of the multiplier (406), the output of the second squaring unit (408) is connected to the second inputs of the summer (404) and subtraction unit (413), and the second input of the multiplier (406) is connected to the second input of the SNR estimation unit (2), there are also series-connected third squaring unit (411) third mean unit (412), the output of which is connected to the first input of the subtraction unit (413), and the input of the third squaring unit (411) is connected to the second input of the SNR estimation unit (2).

In the fourth embodiment of the device of the present invention, to estimate the current signal-to-noise ratio, the SNR estimation unit (2) is made as series-connected absolute value calculation unit (501), first mean unit (502), first squaring unit (503), first summer (504), first subtraction unit (519), divider (512) and dB-recalculation unit (513), the output of which is the output of the SNR estimation unit (2), and the input of the absolute value calculation unit (501) is connected to the first input of the SNR estimation unit (2), the output of the first squaring unit (503) is connected to the first input of the first summer (504), the output of which is connected to the input of the first subtraction unit (519), the output of which is connected to the second input of the divider (512), as well as series-connected second squaring unit (505), second mean unit (506), second subtraction unit (507), second summer (508), the output of which is connected to the first inputs of the second subtraction unit (507) and third summer (511), the output of the second subtraction unit (507) is connected to the first input of the second summer (508), and the output of the third summer (511) is connected to the first input of the first subtraction unit (519), and the input of the second squaring unit (505) is connected to the first input of the SNR estimation unit (2), as well as series-connected third squaring unit (509) and third mean unit (510), the output of which is connected to the second inputs of the second subtraction unit (507) and third summer (511), and the input of the third squaring unit (509) is connected to the second input of the SNR estimation unit (2), series-connected sign determination unit (514), multiplier (515), fourth mean unit (516), fourth squaring unit (517) and scaling unit (518), the output of which is connected to the second input of the second summer (508), the output of the fourth squaring unit (517) is also connected to the second input of the first summer (504), the sign determination unit (514) is connected to the first input of the SNR estimation unit (2), and the second input of the multiplier (515) is connected to the second input of the SNR estimation unit (2).

In the fifth embodiment of the device of the present invention to estimate the current signal-to-noise ratio, the SNR estimation unit is made as series-connected first squaring unit (601), summer (603), square-root unit (604), first mean unit (605), second squaring unit (606), divider (607), scaling unit (610) and dB-recalculation unit (611), the output of which is the output of the SNR estimation unit (2), and the input of the first squaring unit (601) is the first input of the SNR estimation unit (2), the output of the first squaring unit (601) is connected to the first input of the summer (603), and the output of the second squaring unit (606) is connected to the first input of the divider (607), the input of the second squaring unit (602) is the second input of the SNR estimation unit (2), and its output is connected to the second input of the summer (603), the output of which is also connected to the input of second mean unit (608), the output of which is connected to the first input of the subtraction unit (609), the output of which, in turn, is connected to the second input of the divider (607), and the second input of the subtraction unit (609) is connected to the output of the second squaring unit (606).

In the sixth embodiment of the device of the present invention to estimate the current signal-to-noise ratio, the SNR estimation unit differs from the fifth embodiment in adding the second subtraction unit (612), the output of which is the output of the SNR estimation unit (2), and the correction calculation unit (613), the output of the dB-recalculation unit (611) is connected to the first input of the second subtraction unit (612), the input of the correction calculation unit (613) is connected to the output of the square-root unit (604), and the output of the correction calculation unit (613) is connected to the second input of the second subtraction unit (612).

In the embodiment of the device of the present invention to estimate the current signal-to-noise ratio, the SNR estimation unit is made as series-connected first squaring unit (701), summer (702), first mean unit (703), first subtraction unit (704), scaling unit (705), divider (706), second subtraction unit (707) and dB-recalculation unit (708), the output of which is the output of the SNR estimation unit (2), the input of the first squaring unit (701) is the first input of the SNR estimation unit (2), the second input of which is the input of the second squaring unit (709), the output of the second squaring unit (709) is connected to the second input of the summer (702), as well as series connected square-root unit (710), second mean unit (711) and third squaring unit (712), the input of the square-root unit (710) is connected to the output of the summer (702), and the output of the third squaring unit (712) is connected to the second input of the first subtraction unit (704), in addition, the output of the first mean unit (703) is connected to the second input of the divider 706, the output of unit-generation unit (713) is connected to the second input of the second subtraction unit (707).

Note that the correction calculation unit (613) in the sixth embodiment can be made in the form of series-connected first squaring unit (802), first mean unit (803), subtraction unit (804), factor 4 ln 10-scaling unit (805), the output of which is the output of the correction calculation unit (613), and the input of the first squaring unit (802)—its input, as well as series-connected second mean unit (806) and second squaring unit (807), the output of which is connected to the second input of the subtraction unit (804), and the input of the second mean unit (806) is connected to the input of the first squaring unit (802).

In addition, in the sixth embodiment, the calculation unit (613) can be made as a series-connected first squaring unit (902), first mean unit (903), first subtraction unit (904), factor 2-scaling unit (905), first summer (906), first multiplier (907) and dB-recalculation unit (908), the output of which is the output of the correction calculation unit (613), the input of which is connected to the input of the first squaring unit, the output of factor 2-scaling unit (905) is connected to the first input of the first summer (906), the output of the first constant signal 1-generation unit (901) being connected to the second input of the first summer (906), as well as there are series-connected second mean unit (909) and second squaring unit (910), the input of the second mean unit (909) is connected to the input of the correction calculation unit (613), and the input of the second squaring unit (910) is connected to the second input of the subtraction unit (904), and series-connected square-root unit (915), second multiplication unit (921), third division unit (928), third subtraction unit (929), factor 4.5-scaling unit (930), third multiplication unit (931) and fourth summer (932), the output of which is connected to the second input of the first multiplier (907), the input of the first square-root unit (915) is connected to the output of the first mean unit (903), the output of the first square-root unit (915) is connected to the first input of the second multiplication unit (921), the second input of which is connected to the output of the second mean unit (909), the second input of the third divider (928) through series-connected cubing unit (924) and first factor 2-scaling unit (926) is connected to the output of the first mean unit (903), the output of the second constant signal I-generation (927) being connected to the second input of the third subtraction unit (929), the second input of the third multiplication unit (931) being connected to the output of the first subtraction unit (904) through series-connected second summer (912), second square-root unit (913), second factor 2-scaling unit (914), second division unit (920), and tangent-calculation unit (925), the second input of the second summer (912) is connected to the output of constant signal 0.1-generation unit (911), and the second input of the second divider (920) is connected to the output of the third summer (919), the first input of which is connected to the output of the first mean unit (903), and the second input—to the output of the constant signal 1.1-generation unit (918), the second input of the fourth summer (932) being connected to the output of the first mean unit (903) through series-connected first division unit (917) and second subtraction unit (923), the output of the constant signal 3-generation unit (916) being connected to the second input of the first division unit (917), and the output of the constant signal 4.7-generation unit (922) being connected to the second input of the second subtraction unit.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS OF THE INVENTION

Reference will now be made in detail to the embodiments of the present invention, examples of which are illustrated in the accompanying drawings.

At the receiver input there is additive mixture y(t) of the narrow-band desired signal s(t) and additive white Gaussian noise (AWGN) n(t):

$$y(t)=s(t)+n(t). \qquad (1)$$

The components in the bandwidth of the receiving device can be presented as complex signals:

$$s(t)=\mathrm{Re}\{\dot{S}(t)\exp(j\omega_0 t)\}, \qquad (2)$$

$$n(t)=\mathrm{Re}\{\dot{N}(t)\exp(j\omega_0 t)\}, \qquad (3)$$

$$y(t)=\mathrm{Re}\{\dot{Y}(t)\exp(j\omega_0 t)\}=\mathrm{Re}\{(\dot{S}(t)+\dot{N}(t))\exp(j\omega_0 t)\}, \qquad (4)$$

Figure 1:
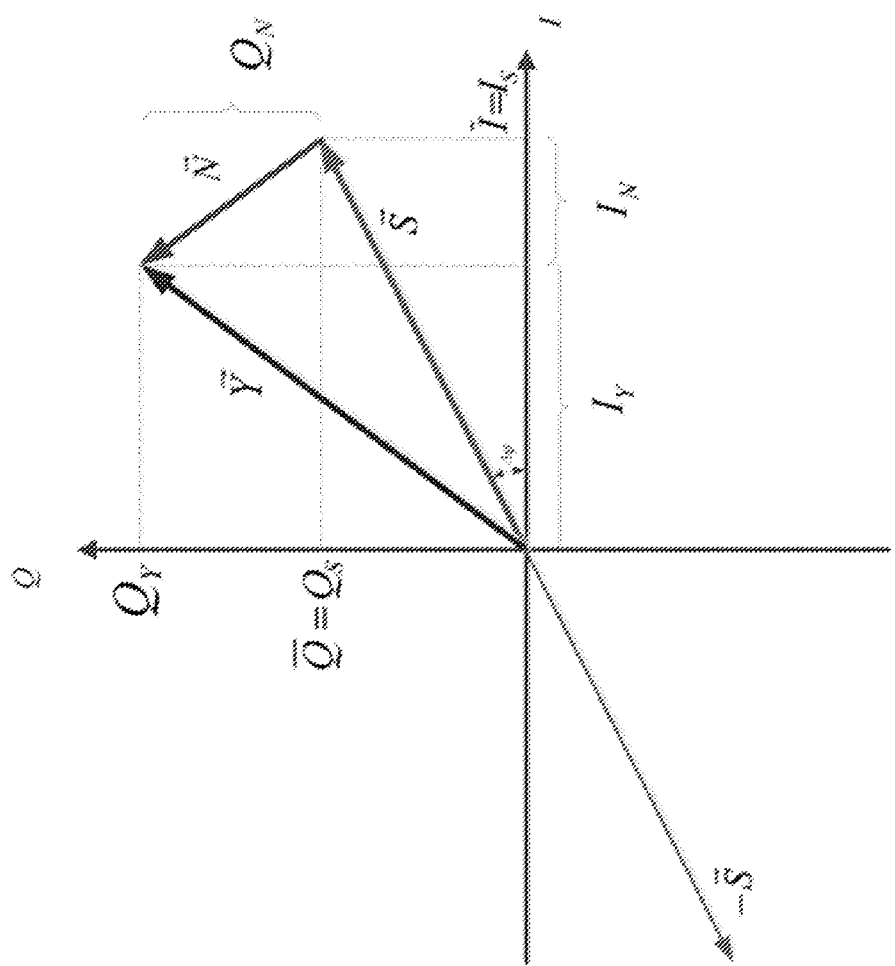
FIG. 1 shows a vector diagram of relations for quadrature components of the complex envelope of the received signal and noise mixture.

In accordance with FIG. 1 the signal-to-noise ratio at the receiver input can be determined as follows:

$$SNR_{in} = h_{sn_{in}}^2 = \frac{P_s}{P_n} = \frac{\overline{S^2}}{\overline{N^2}} = \frac{\overline{S^2}}{2\overline{Q_N^2}} = \frac{\overline{S^2}}{2\overline{I_N^2}}, \qquad (5)$$

where $P_s$ is the mean strength of the desired signal at the receiver input;

$P_s$ is the mean strength of the desired signal at the receiver input being determined in its bandwidth;

$\overline{S^2}$ is the mean-square amplitude of the received signal;

$\overline{N^2}$ is the mean-square value of the noise complex envelope;

$\overline{Q_N^2} = \overline{I_N^2}$ is the mean square of the quadrature component of the noise complex envelope.

In practice, signal-to-noise ratio estimation is mostly implemented on the basis of signal samples at the output of the matched filters. Accordingly, samples of signals $I_Y$, $Q_Y$ at the output of the in-phase and quadrature matched filters can be considered as projections of the sum vector for signal $\vec{Y}$ onto the quadrature axes (see FIG. 1).

Values in expression (5) can be determined based on processing the samples of quadrature components of the received mixture of the signal and noise $I_Y$, $Q_Y$. Strictly speaking, one needs to take into account the sign of the received channel symbol during the mean operation, this is especially important in meaning the quadrature component $Q_Y$. In practice it can be done, for example, with the following algorithm:

$$\overline{Q_Y} = \overline{|Q_Y|} = \overline{Q_Y \cdot \mathrm{sign}(I_Y)}. \qquad (6)$$

Considering this fact, from expression (5) one can obtain the following variants of relationships to calculate a signal-to-noise ratio in the logarithmic scale:

$$SNR_{dB} = 10 lg\left(\frac{\overline{|I_Y|}^2 + \overline{|Q_Y|}^2}{\overline{I_Y^2} + \overline{Q_Y^2} - (\overline{|I_Y|}^2 + \overline{|Q_Y|}^2)}\right), \qquad (7)$$

$$SNR_{dB} = 10 lg\left(\frac{\overline{I_Y^2} - \overline{Q_Y^2} + 2\overline{|Q_Y|}^2}{2\cdot(\overline{Q_Y^2} - \overline{|Q_Y|}^2)}\right), \qquad (8)$$

$$SNR_{dB} = 10 lg\left(\frac{\overline{|I_Y|}^2 + \overline{|Q_Y|}^2}{2\cdot(\overline{Q_Y^2} - \overline{|Q_Y|}^2)}\right), \qquad (9)$$

$$SNR_{dB} = 10 lg\left(\frac{\overline{I_Y^2} - \overline{Q_Y^2} + 2\overline{|Q_Y|}^2}{\overline{I_Y^2} + \overline{Q_Y^2} - (\overline{|I_Y|}^2 + \overline{|Q_Y|}^2)}\right). \qquad (10)$$

A rule-of-thumb relationship $$SNR_{dB} \approx 10 lg\left(\frac{\overline{\sqrt{I_y^2 + Q_y^2}}^2}{2\cdot\left(\overline{\sqrt{I_y^2 + Q_y^2}}^2 - \overline{\sqrt{I_y^2 + Q_y^2}}^2\right)}\right), \qquad (11)$$

can also be used, or a modified relationship $$SNR_{dB} \approx 10 lg\left(\frac{\overline{\sqrt{I_y^2 + Q_y^2}}^2}{2\cdot\left(\overline{\sqrt{I_y^2 + Q_y^2}}^2 - \overline{\sqrt{I_y^2 + Q_y^2}}^2\right)}\right) - SNR_{add}. \qquad (12)$$

The compensational additive member $SNR_{add}$ is calculated according to $$SNR_{add} = 4\cdot(\overline{x^2} - \overline{x}^2)\cdot\ln(10) \qquad (13)$$

or according to formula $$SNR_{add} = 10 \cdot lg\left[\left(1 + 2 \cdot \left(\overline{x^2} - \overline{x}^2\right)\right) \cdot \left[4.7 - \frac{3}{\overline{x^2}} + 4.5 \cdot \left[\frac{\overline{x} \cdot \sqrt{\overline{x^2}}}{2 \cdot \overline{x}^3} - 1\right] lg\left(\frac{2 \cdot \sqrt{0.1 + \overline{x^2}} - \overline{x}^2}{1.1 + \overline{x^2}}\right)\right]\right], \quad (14)$$

where $x = |\vec{Y}| = \sqrt{I_Y^2 + Q_Y^2}$ is the current amplitude envelope of the received signal-noise mixture.

A proposed and empirically proved relationship can also be used:

$$SNR_{dB} = 10 lg\left(\frac{\overline{\sqrt{I_y^2 + Q_y^2}}^2}{2\left(\overline{\sqrt{I_y^2 + Q_y^2}}^2 - \overline{\sqrt{I_y^2 + Q_y^2}}^2\right)} - 1\right). \quad (15)$$

Therefore, the core of the claimed method for SNR evaluation in receiving a sequence of phased-modulated symbols is in the following operations:
 receiving additive mixture y(t)=s(t)+n(t) of a sequence of fixed-long symbols with phase modulation s(t) and AWGN n(t),
 separating quadrature components of the complex envelope for the received signal $I_Y$ and $Q_Y$ in the quadrature mixer,
 determining a mean-square value of in-phase component $\overline{I_Y^2}$ for the given selection length, hereafter, the line over is the mean value of the corresponding parameter in time for the given selection length,
 determining mean-square value for quadrature component $\overline{Q_Y^2}$,
  determining absolute value mean-square of in-phase component $|\overline{I_Y}|^2$,
  determining a mean-square of quadrature component $|\overline{Q_Y}|^2$, values of the quadrature component are averaged considering the sign of the received channel symbol,
  determining the current modulus (vector length) for the complex signal envelope $\sqrt{I_Y^2 + Q_Y^2}$,
  calculating the current signal-to-noise ratio with a combination of all or part of the obtained values in accordance with expressions (7)-(13),
  compensating for a systematic error of the current SNR if needed.

Technical implementation of the proposed method in the form of a device can be produced according to the schematics shown in FIGS. 2-12.

Figure 2:
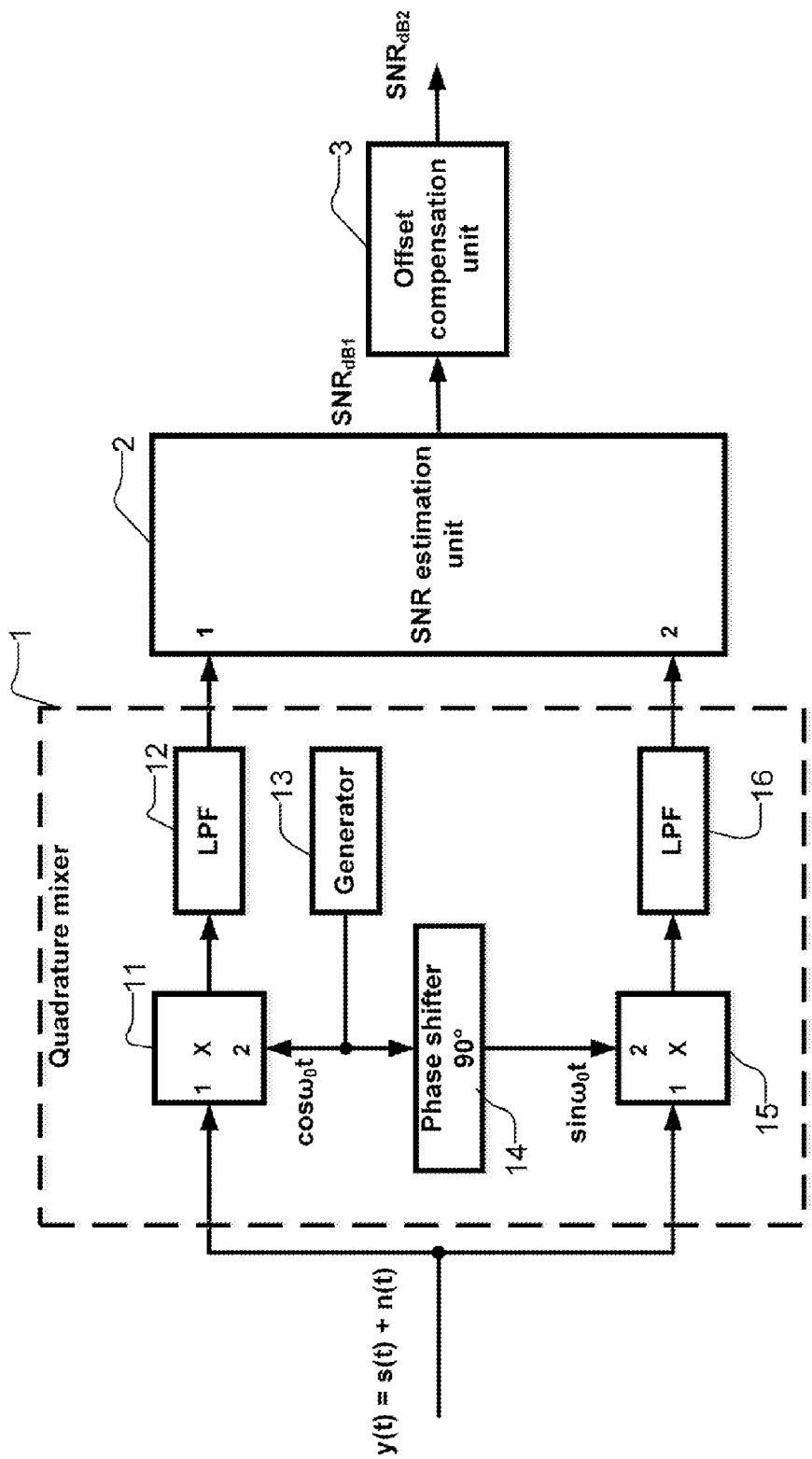
FIG. 2 shows general schematics of the inventive device.

A general diagram of the device to measure the current signal-to-noise ratio is presented in FIG. 2 and includes a quadrature mixer (1), an SNR estimation unit (2), and an offset compensation unit (3). The quadrature mixer (1) can further include a series-connected first multiplier (11) and a first low-frequency filter (LFF) (12), a series-connected second multiplier (15) and a second LFF (16), a harmonic signal generator (13) and a phase-shifter (14).

The input of the quadrature mixer (1) is connected to the first inputs of the first (11) and second (15) multipliers, the output of the generator (13) is connected to the second input of the first multiplier (11) and to the input of the phase-shifter (14), the output of which is connected to the second input of the second multiplier (15). The outputs of the first (12) and second (16) LFF, which are connected respectively tot the first and second inputs of the SNR estimation unit (2), are the first and second outputs of the quadrature mixer (1). The output of the device is the output of the offset compensation unit (3).

An input signal-noise mixture is fed to the quadrature mixer with two channels. The first channel that includes the multiplier (11) and the low-frequency filter (12) separates the in-phase component of the complex envelope of the received mixture. The second channel that includes the multiplier (15) and the low-frequency filter (16) separates the quadrature component of the complex envelope of the received mixture. In practice, to estimate signal-to-noise ratio, signals received at the filter outputs are often used, these filters being matched with the received channel symbols. In this case, amplitude and phase characteristics of the low-frequency filters (12) and (16) are to be matched with the corresponding parameters of the channel symbols.

All embodiments of the SNR estimation unit (2) considered below are based upon processing quadrature components both with matched filtering in LFF (12) and (16), and without it (matched filtering).

Figure 3:
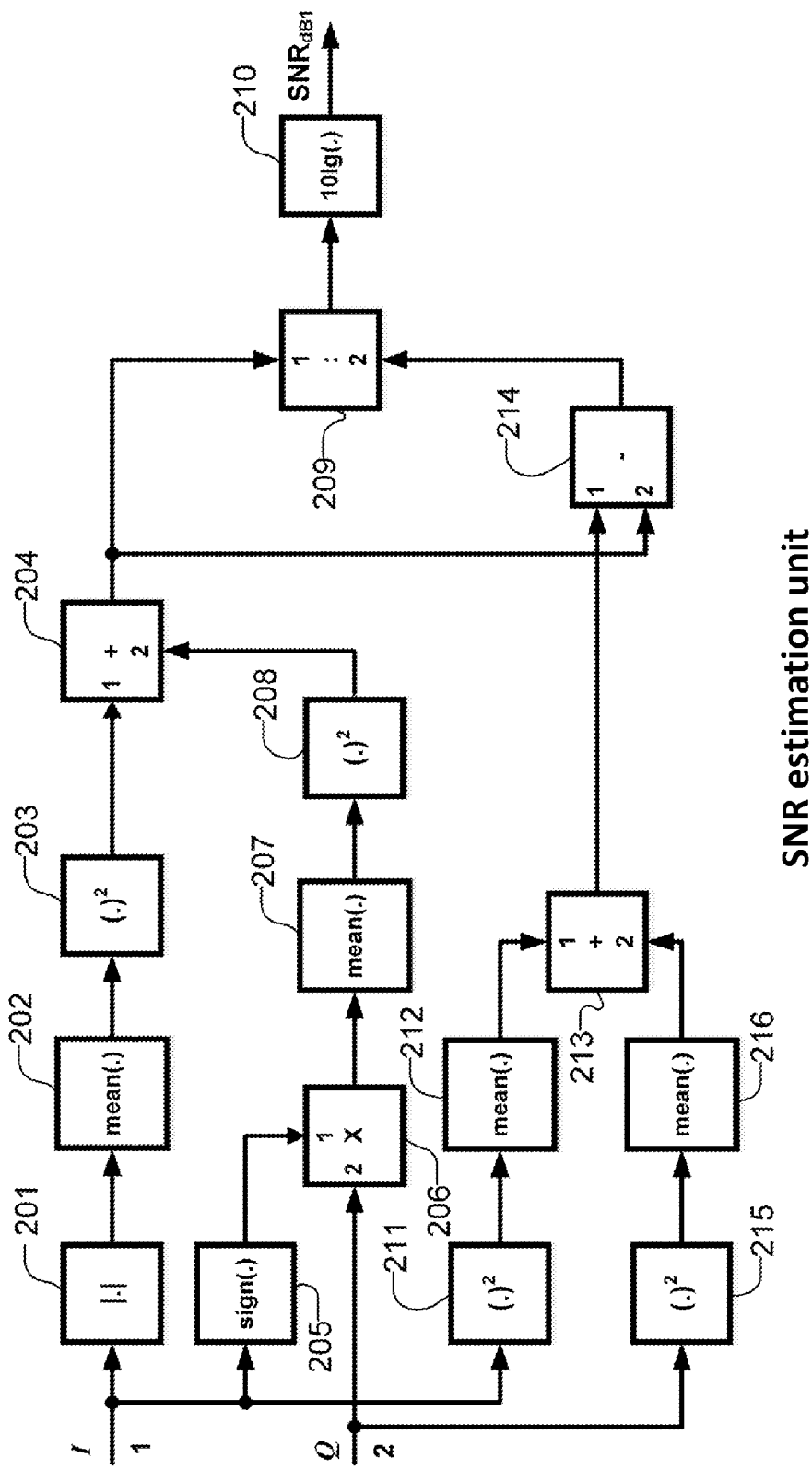
FIG. 3 shows a scheme of a first embodiment of the SNR estimation unit.

The first embodiment of the SNR estimation unit (2) is shown in FIG. 3. The SNR estimation unit (2) is made as a series-connected absolute value/module calculation unit (201), a first mean unit (202), a first squaring unit (203), a first summer (204), divider/splitter (209) and a dB-recalculation unit (210); the input of the absolute value calculation unit (201) being the first input of the SNR estimation unit (2), the output of the squaring unit (203) is connected to the first input of the first summer (204), the output of which is connected to the first input of a divider (209), and the output of the dB-recalculation unit (210) being the output of the SNR estimation unit (2). The SNR estimation unit (2) includes a series-connected sign determination unit (205), a multiplier (206), a second mean unit (207), a second squaring unit (208). The input of the unit for determination sign (205) is switched to the first input of the SNR estimation unit (2), and its output is switched to the first input of the multiplier (206), the second input of which is connected to the second input of the SNR estimation unit (2). T output of the second squaring unit (208) is switched to the second input of the first summer (204). The SNR estimation unit (2) also includes a series-connected third squaring unit (211), a third mean unit (212), a second summer (213) and a subtraction unit (214). The input of the third squaring unit (211) is connected to the first input of the SNR estimation unit (2), the output of the third mean unit (212) is connected to the first input of the second summer (213), the output of which is connected to the first input of the subtraction unit (214).

The output of which is connected to the second input of the divider (209), and the second input is connected to the output of the first summer (204), in addition, the SNR estimation unit (2) includes the series connected fourth squaring unit (215) and fourth mean unit (216), the input of the fourth squaring unit (215) is connected to the second input of the SNR estimation unit (2), and the output of the fourth mean unit (216) is connected to the second input of the second summer (213).

Figure 4:
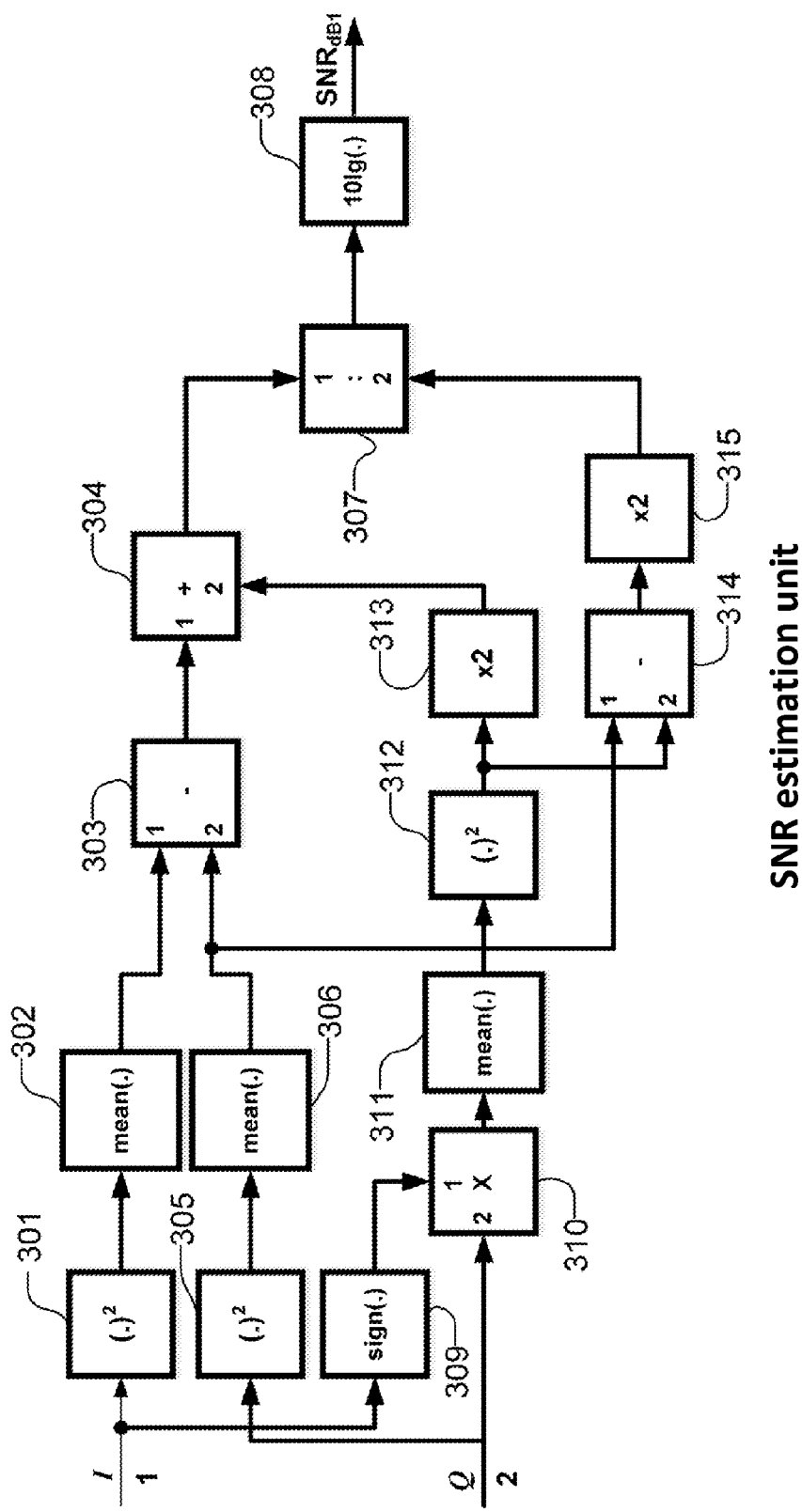
FIG. 4 shows a scheme of a second embodiment of the SNR estimation unit.
Figure 5:
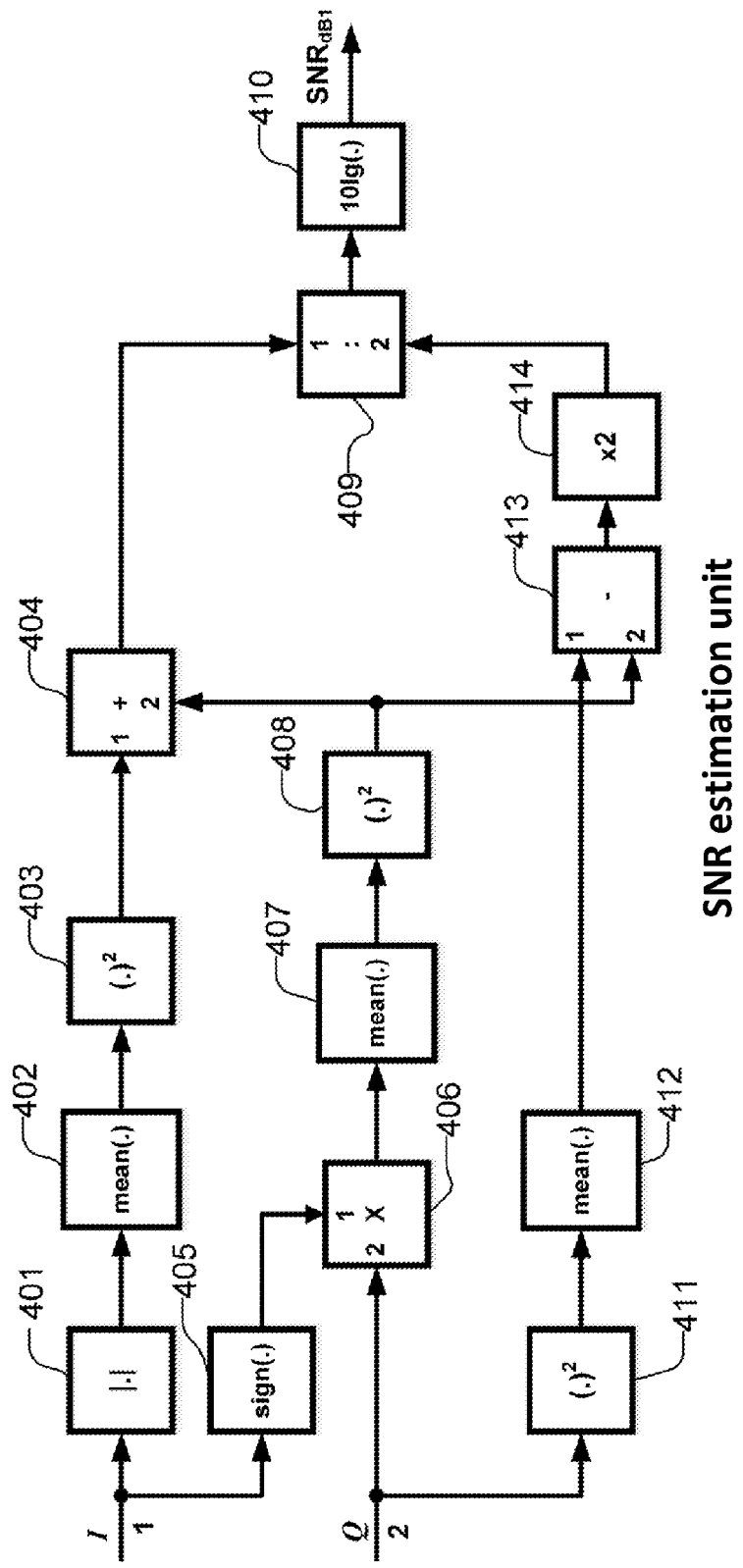
FIG. 5 shows a scheme of a third embodiment of the SNR estimation unit.
Figure 6:
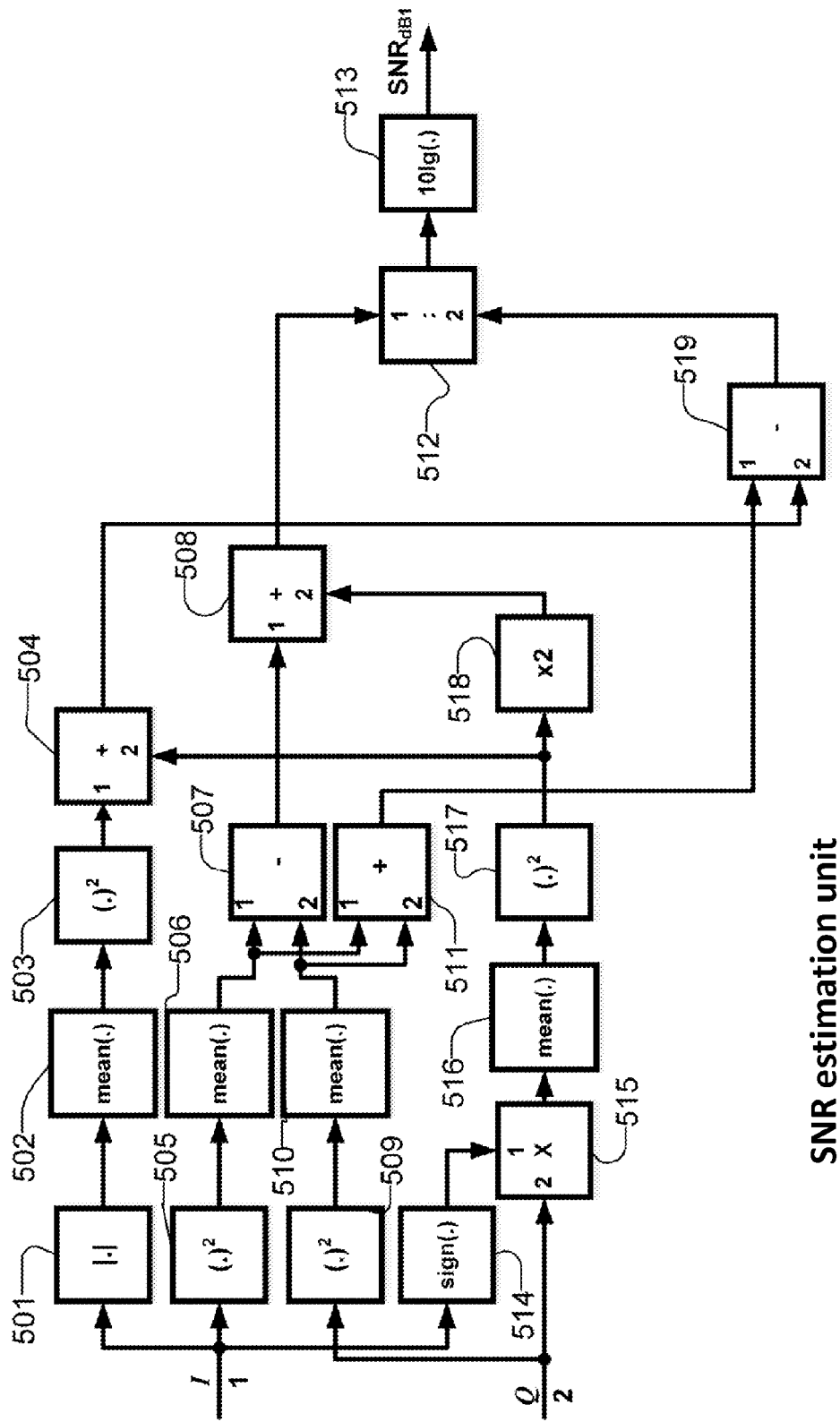
FIG. 6 shows a scheme of a fourth embodiment of the SNR estimation unit.
Figure 7:
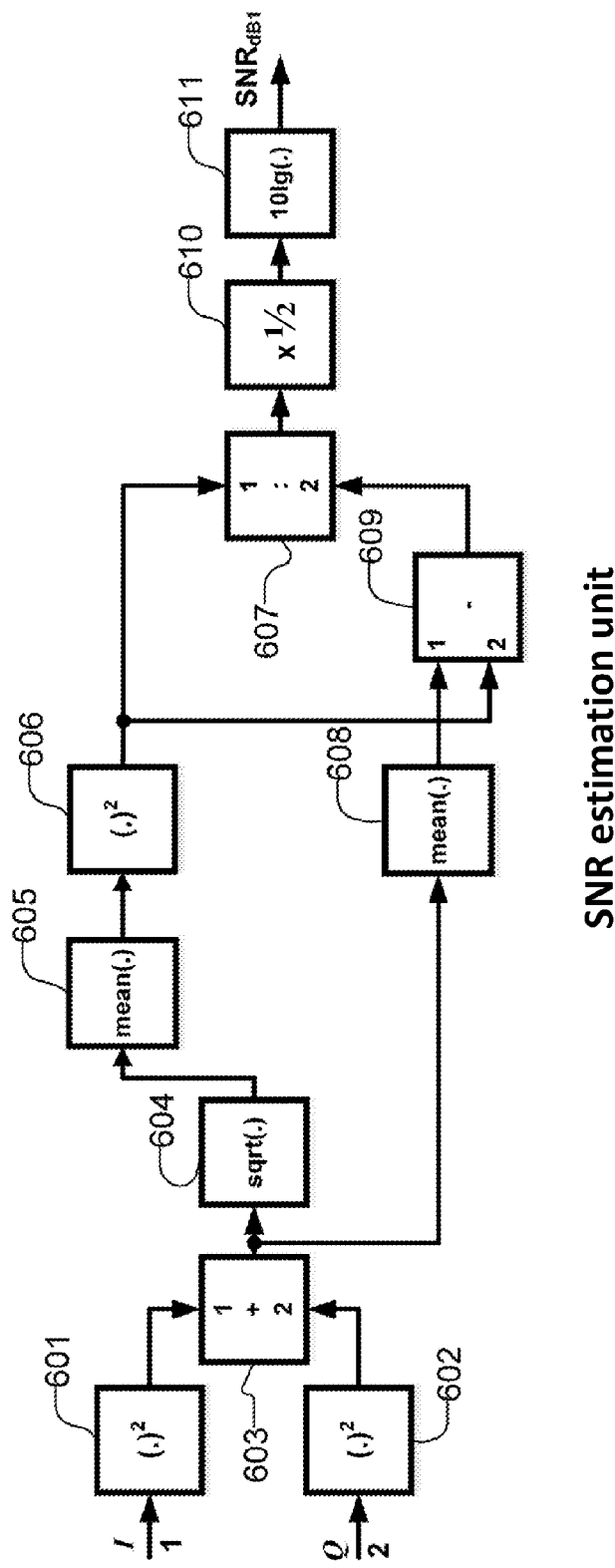
FIG. 7 shows a scheme of a fifth embodiment of the SNR estimation unit.
Figure 8:
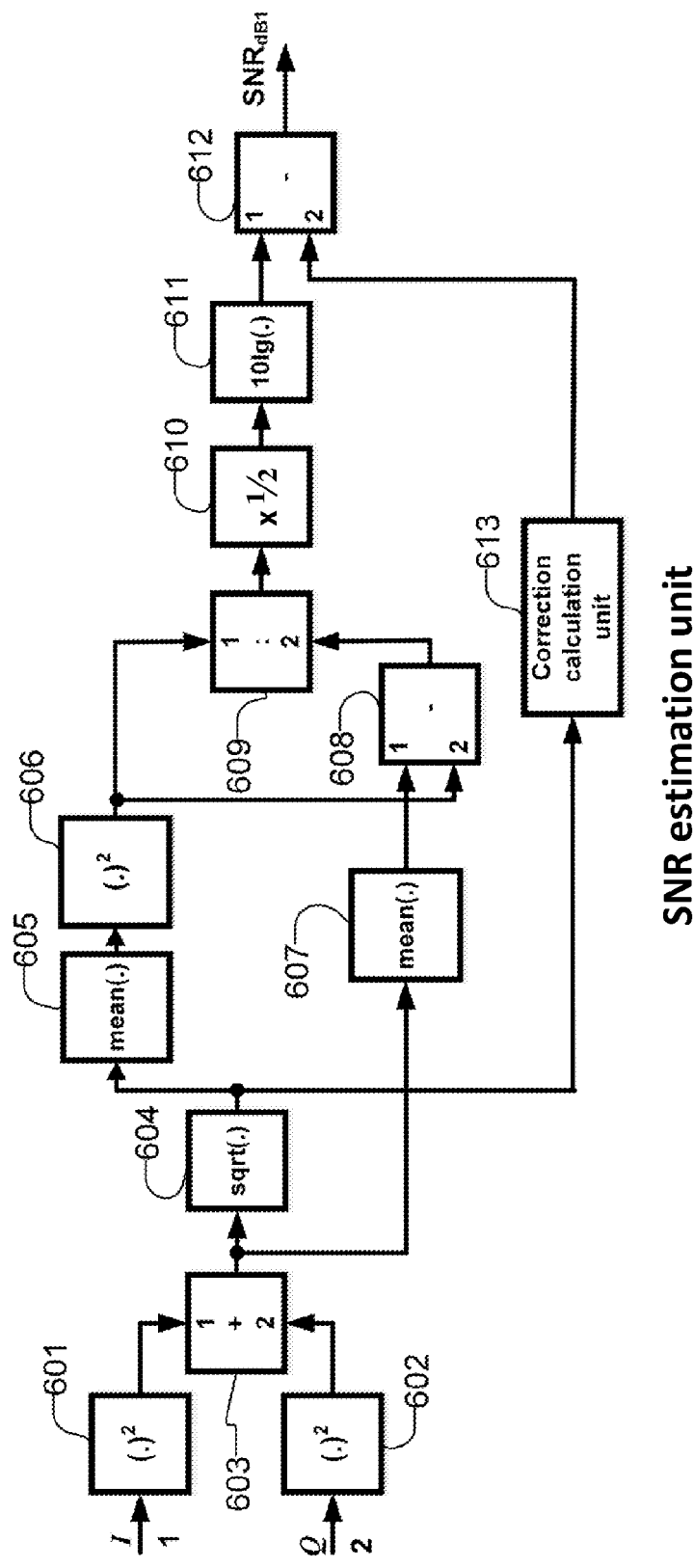
FIG. 8 shows a scheme of a sixth embodiment of the SNR estimation unit.
Figure 9:
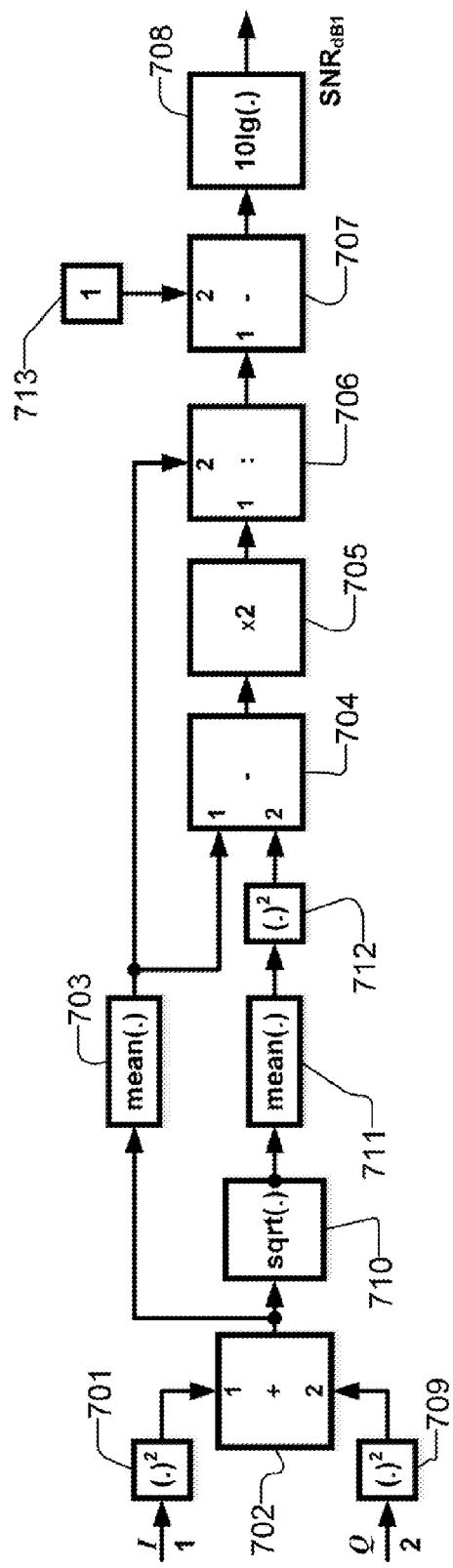
FIG. 9 shows a scheme of a seventh embodiment of the SNR estimation unit.
Figure 10:
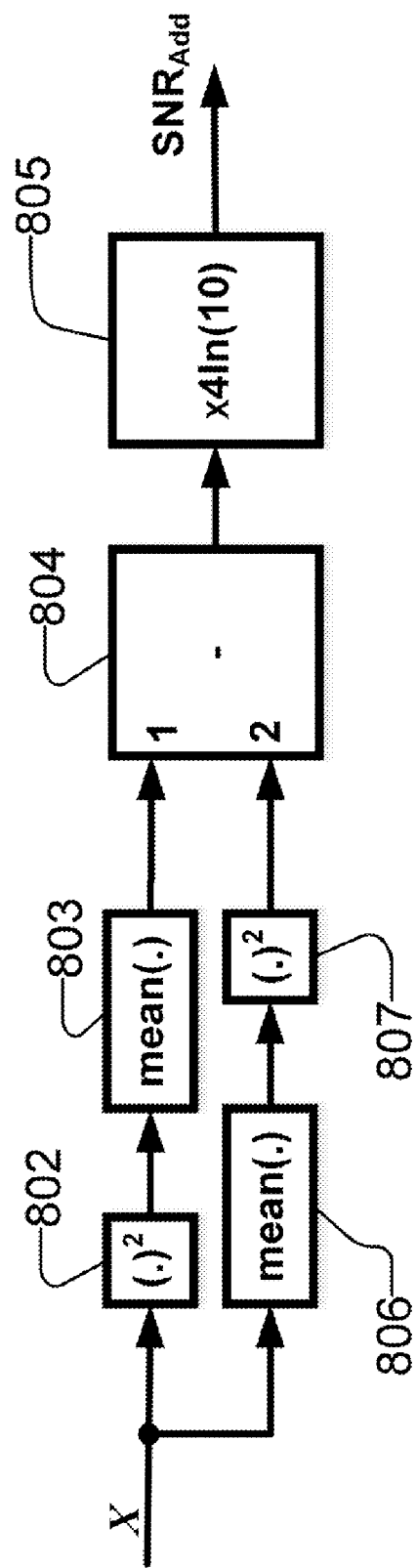
FIG. 10 shows a schematic of a first embodiment for the correction calculation unit.
Figure 11:
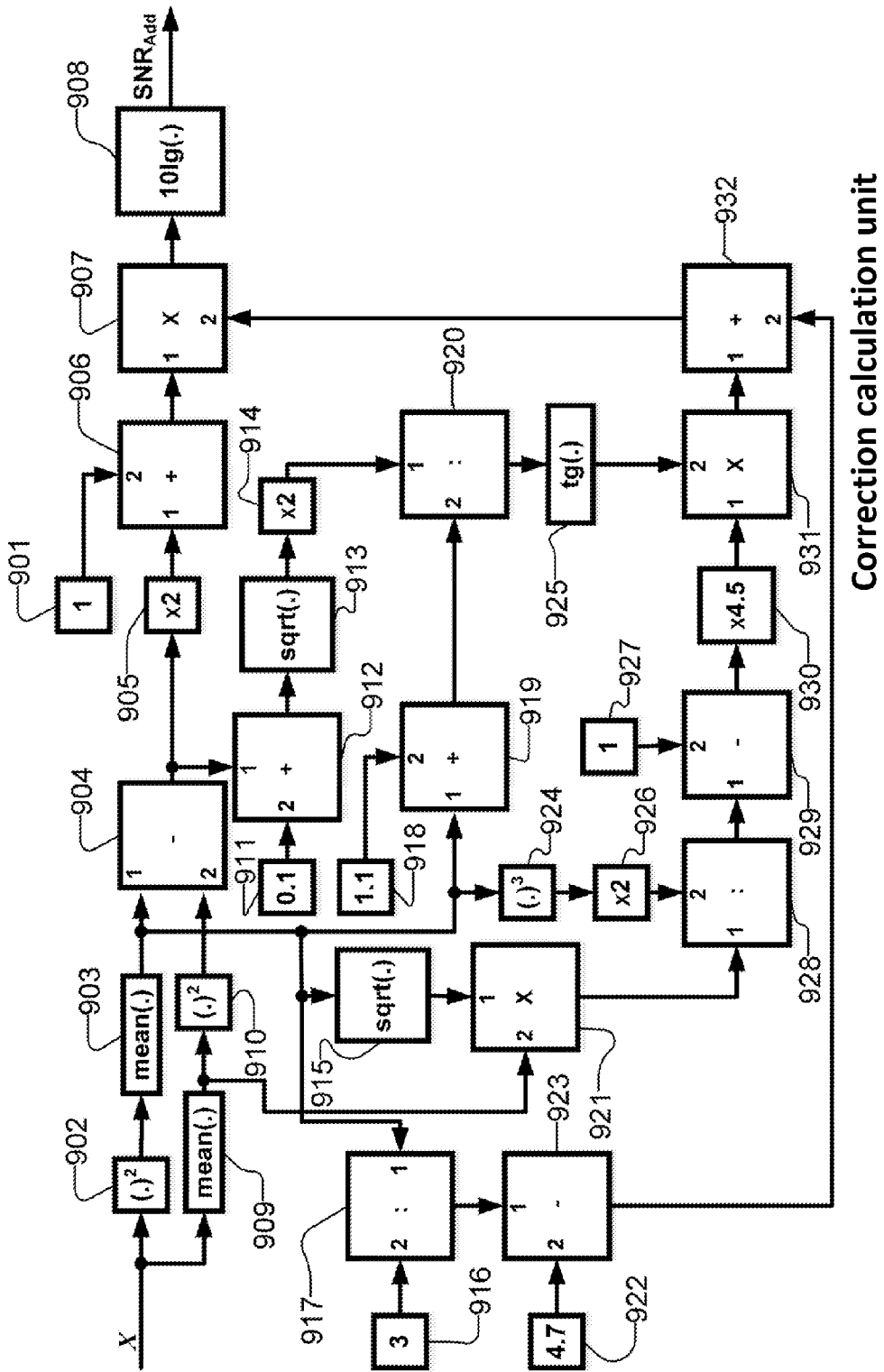
FIG. 11 shows a schematic of a second embodiment for the correction calculation unit.
Figure 12:
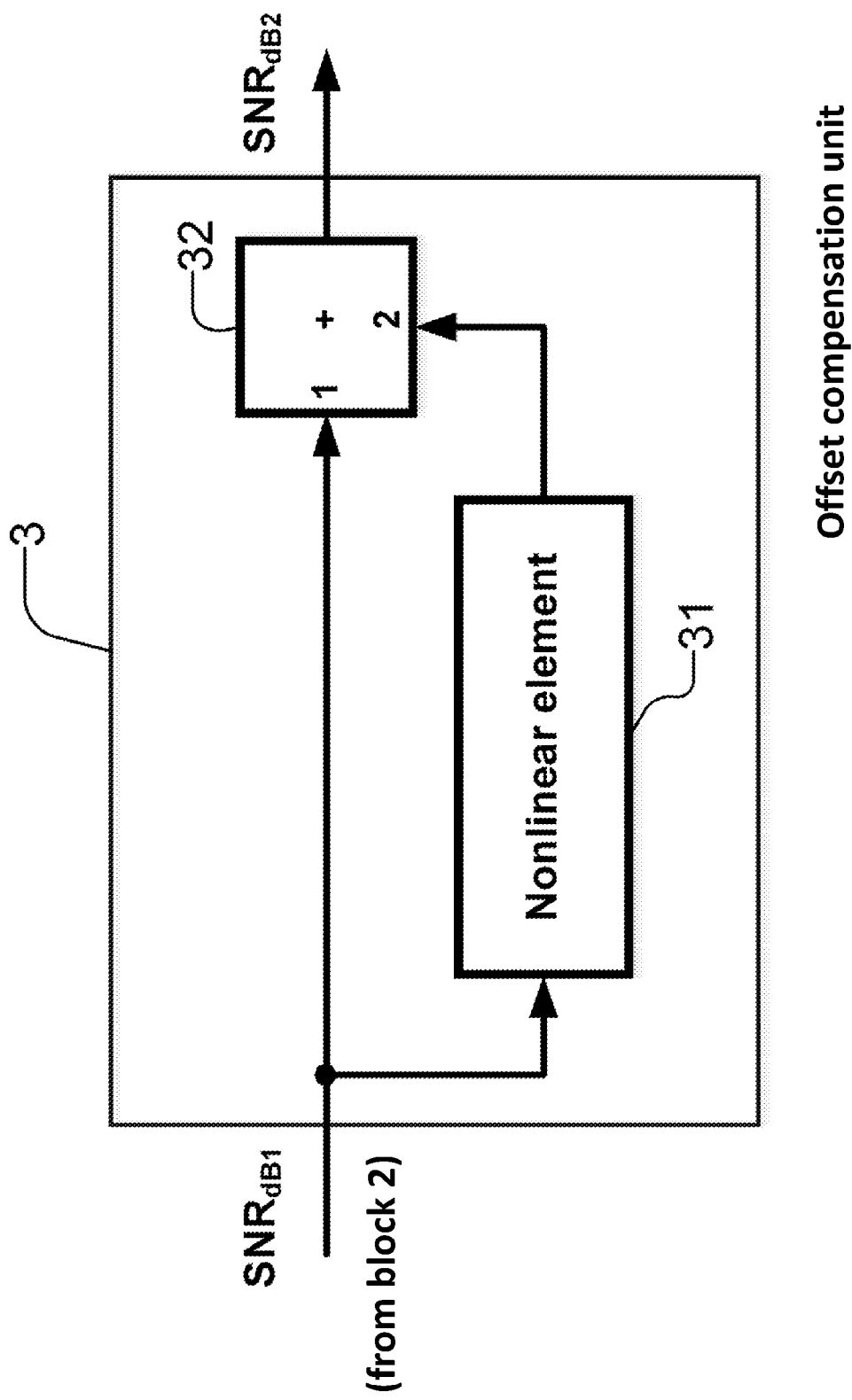
FIG. 12 shows a scheme of a second embodiment for the offset compensation unit.

In the second embodiment of a device to measure the current signal-to-noise ratio, the SNR estimation unit (2), see FIG. 4, is a series-connected first squaring unit (301), first a mean unit (302), a first subtraction unit (303), a summer (304), a divider (307) and a dB-recalculation unit (308), the output of which is the output of the SNR estimation unit (2). The input of the squaring unit (301) is the first input of the SNR estimation unit (2), the output of the first mean unit (302) is connected to the first input of the first subtraction unit (303), the output of which is connected to the first input of the summer (304), the output of which is connected to the first input of the divider (307). A series-connected second squaring unit (305) and second mean unit (306), and the input of the second squaring unit (305) is connected to the second input of the SNR estimation unit (2), the output of the second mean unit (306) is connected to the second input of the first subtraction unit (303) and to the first input of the second subtraction unit (314). The device also includes series-connected sign determination unit (309), a multiplier (310), a third mean unit (311), a third squaring unit (312), and a first scaling unit (313), the output of which is connected to the second input of the summer (304).

The input of the sign determination unit (309) is connected to the first input of the SNR estimation unit (2), and the output of the sign determination unit (309) is connected to the first input of the multiplier (310), the second input of which is connected to the second input of the SNR estimation unit (2). The device also includes a series-connected second subtraction unit (314) and a second scaling unit (315), the output of which is connected to the second input of the divider (307), and the first input of the subtraction unit (314) is connected to the output of the second mean unit (306), and the second input—to the output of the third squaring unit (312).

In the third embodiment of the device to measure signal-to-noise, the SNR estimation unit (see FIG. 5) includes a series-connected absolute value calculation unit (401), a first mean unit (402), a first squaring unit (403), a summer (404), a divider (409) and a dB-recalculation unit (410), the output of which is the output of the SNR estimation unit (2), and the input of the absolute value calculation unit (401) is connected to the first input of the SNR estimation unit (2). The output of the first squaring unit (403) is connected to the first input of the summer (404), the output of which is connected to the first input of the divider (409). The device also includes a series-connected sign determination unit (405), a multiplier (406), a second mean unit (407), a second squaring unit (408), a subtraction unit (413) and a scaling unit (414), the output of which is connected to the second input of the divider (414).

The input of the sign determination unit (405) is connected to the first input of the SNR estimation unit (2), and its output is connected to the first input of the multiplier (406), the output of the second squaring unit (408) is connected to the second inputs of the summer (404) and subtraction unit (413), and the second input of the multiplier (406) is connected to the second input of the SNR estimation unit (2). The device also includes a series-connected third squaring unit (411), a third mean unit (412), the output of which is connected to the first input of the subtraction unit (413), and the input of the third squaring unit (411) is connected to the second input of the SNR estimation unit (2).

In the fourth embodiment of the invention to estimate the current signal-to-noise ratio (see FIG. 6), the SNR estimation unit (2) a series-connected absolute value calculation unit (501), a first mean unit (502), a first squaring unit (503), a first summer (504), first subtraction unit (519), a divider (512) and a dB-recalculation unit (513) are used, the output of the dB-recalculation unit (513) is the output of the SNR estimation unit (2). The input of the absolute value calculation unit (501) is connected to the first input of the SNR estimation unit (2), the output of the first squaring unit (503) is connected to the first input of the first summer (504), the output of which is connected to the input of the first subtraction unit (519), the output of which is connected to the second input of the divider (512). The device also includes a series-connected second squaring unit (505), second mean unit (506), second subtraction unit (507), second summer (508), the output of which is connected to the first inputs of the second subtraction unit (507) and third summer (511), the output of the second subtraction unit (507) is connected to the first input of the second summer (508), and the output of the third summer (511) is connected to the first input of the first subtraction unit (519), and the input of the second squaring unit (505) is connected to the first input of the SNR estimation unit (2). The device also includes a series-connected third squaring unit (509) and a third mean unit (510), the output of which is connected to the second inputs of the second subtraction unit (507) and a third summer (511), and the input of the third squaring unit (509) is connected to the second input of the SNR estimation unit (2), a series-connected sign determination unit (514), a multiplier (515), a fourth mean unit (516), fourth squaring unit (517) and scaling unit (518), the output of which is connected to the second input of the second summer (508), the output of the fourth squaring unit (517) is also connected to the second input of the first summer (504), the sign determination unit (514) is connected to the first input of the SNR estimation unit (2), and the second input of the multiplier (515) is connected to the second input of the SNR estimation unit (2).

In the fifth embodiment of the device to estimate the current signal-to-noise ratio (see FIG. 7), the SNR estimation unit includes a series-connected first squaring unit (601), a summer (603), a square-root unit (604), a first mean unit (605), a second squaring unit (606), a divider (607), scaling unit (610) and a dB-recalculation unit (611), the output of which is the output of the SNR estimation unit (2). The input of the first squaring unit (601) is the first input of the SNR estimation unit (2), the output of the first squaring unit (601) is connected to the first input of the summer (603), and the output of the second squaring unit (606) is connected to the first input of the divider (607), the input of the second squaring unit (602) is the second input of the SNR estimation unit (2), and its output is connected to the second input of the summer (603), the output of which is also connected to the input of second mean unit (608), the output of which is connected to the first input of the subtraction unit (609), the output of which, in turn, is connected to the second input of the divider (607), and the second input of the subtraction unit (609) is connected to the output of the second squaring unit (606).

In the sixth embodiment of the device (see FIG. 8) to estimate the current signal-to-noise ratio, the SNR estimation unit differs from that of the fifth embodiment in adding, the second subtraction unit (612), the output of which is the output of the SNR estimation unit (2), and the correction calculation unit (613), the output of the dB-recalculation unit (611) is connected to the first input of the second subtraction unit (612), the input of the correction calculation unit (613) is connected to the output of the square-root unit (604), and the output of the correction calculation unit (613) is connected to the second input of the second subtraction unit (612).

In the seventh embodiment of the device to estimate the current signal-to-noise ratio (see FIG. 9), the SNR estimation unit includes a series-connected first squaring unit (701), summer (702), a first mean unit (703), a first subtraction unit (704), a scaling unit (705), a divider (706), a second subtraction unit (707) and a dB-recalculation unit (708), the output of which is the output of the SNR estimation unit (2), the input of the first squaring unit (701) is the first input of the SNR estimation unit (2), the second input of which is the input of the second squaring unit (709), the output of the second squaring unit (709) is connected to the second input of the summer (702). The device also includes a series connected square-root unit (710), a second mean unit (711) and a third squaring unit (712), the input of the square-root unit (710) is connected to the output of the summer (702), and the output of the third squaring unit (712) is connected to the second input of the first subtraction unit (704), in addition, the output of the first mean unit (703) is connected to the second input of the divider 706, the output of unit-generation unit (713) is connected to the second input of the second subtraction unit (707).

Note that according to equation (13) the correction calculation unit (613) in the sixth embodiment can include (see FIG. 10) a series-connected first squaring unit (802), a first mean unit (803), a subtraction unit (804), a factor 4 ln 10-scaling unit (805), the output of which is the output of the correction calculation unit (613), and the input of the first squaring unit (802) is connected its input, as well as series-connected second mean unit (806) and a second squaring unit (807), the output of which is connected to the second input of the subtraction unit (804), and the input of the second mean unit (806) is connected to the input of the first squaring unit (802).

In addition, according to equation (14), in the sixth embodiment of the claimed device to estimate the current signal-to-noise ratio correction calculation unit (613) can be made (FIG. 11) as a series-connected first squaring unit (902), a first mean unit (903), a first subtraction unit (904), a factor 2-scaling unit (905), a first summer (906), a first multiplier (907) and a dB-recalculation unit (908), the output of which is the output of the correction calculation unit (613), the input of which is connected to the input of the first squaring unit, the output of factor 2-scaling unit (905) is connected to the first input of the first summer (906). The output of the first constant signal 1-generation unit (901) is connected to the second input of the first summer (906). The device also includes a series-connected second mean unit (909) and a second squaring unit (910), the input of the second mean unit (909) is connected to the input of the correction calculation unit (613), and the input of the second squaring unit (910) is connected to the second input of the subtraction unit (904), and a series connected square-root unit (915), a second multiplication unit (921), a third division unit (928), a third subtraction unit (929), a factor 4.5-scaling unit (930), a third multiplication unit (931) and a fourth summer (932), the output of which is connected to the second input of the first multiplier (907).

The input of the first square-root unit (915) is connected to the output of the first mean unit (903), the output of the first square-root unit (915) is connected to the first input of the second multiplication unit (921), the second input of which is connected to the output of the second mean unit (909). The second input of the third divider (928) through series-connected cubing unit (924) and a first factor 2-scaling unit (926) is connected to the output of the first mean unit (903), the output of the second constant signal I-generation (927) is connected to the second input of the third subtraction unit (929), the second input of the third multiplication unit (931) is connected to the output of the first subtraction unit (904) through a series-connected second summer (912), a second square-root unit (913), a second factor 2-scaling unit (914), a second division unit (920), and a tangent-calculation unit (925).

The second input of the second summer (912) is connected to the output of constant signal 0.1-generation unit (911), and the second input of the second divider (920) is connected to the output of the third summer (919), the first input of which is connected to the output of the first mean unit (903), and the second input is connected to the output of the constant signal 1.1-generation unit (918), the second input of the fourth summer (932) being connected to the output of the first mean unit (903) through a series-connected first division unit (917) and a second subtraction unit (923), the output of the constant signal 3-generation unit (916) is connected to the second input of the first division unit (917), and the output of the constant signal 4.7-generation unit (922) being connected to the second input of the second subtraction unit.

The first embodiment of the offset compensation unit (3) is characterized in that this unit is made as a non-linear element whose amplitude characteristic is inverse to the dependence of current SNR expected value on the true signal-to-noise value for the assigned SNR estimation method.

Figure 13:
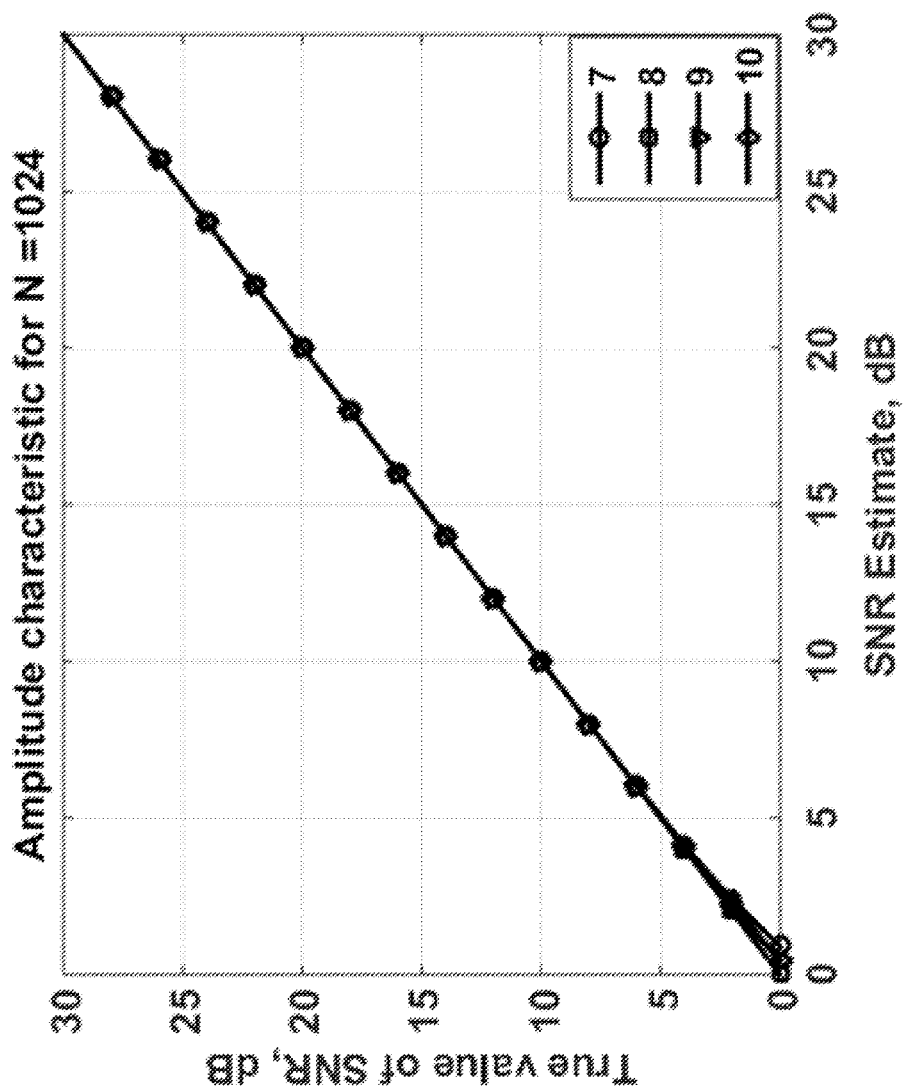
FIG. 13 shows graphs of amplitude characteristics for the offset compensation unit for some embodiments of the SNR estimation unit.
Figure 14:
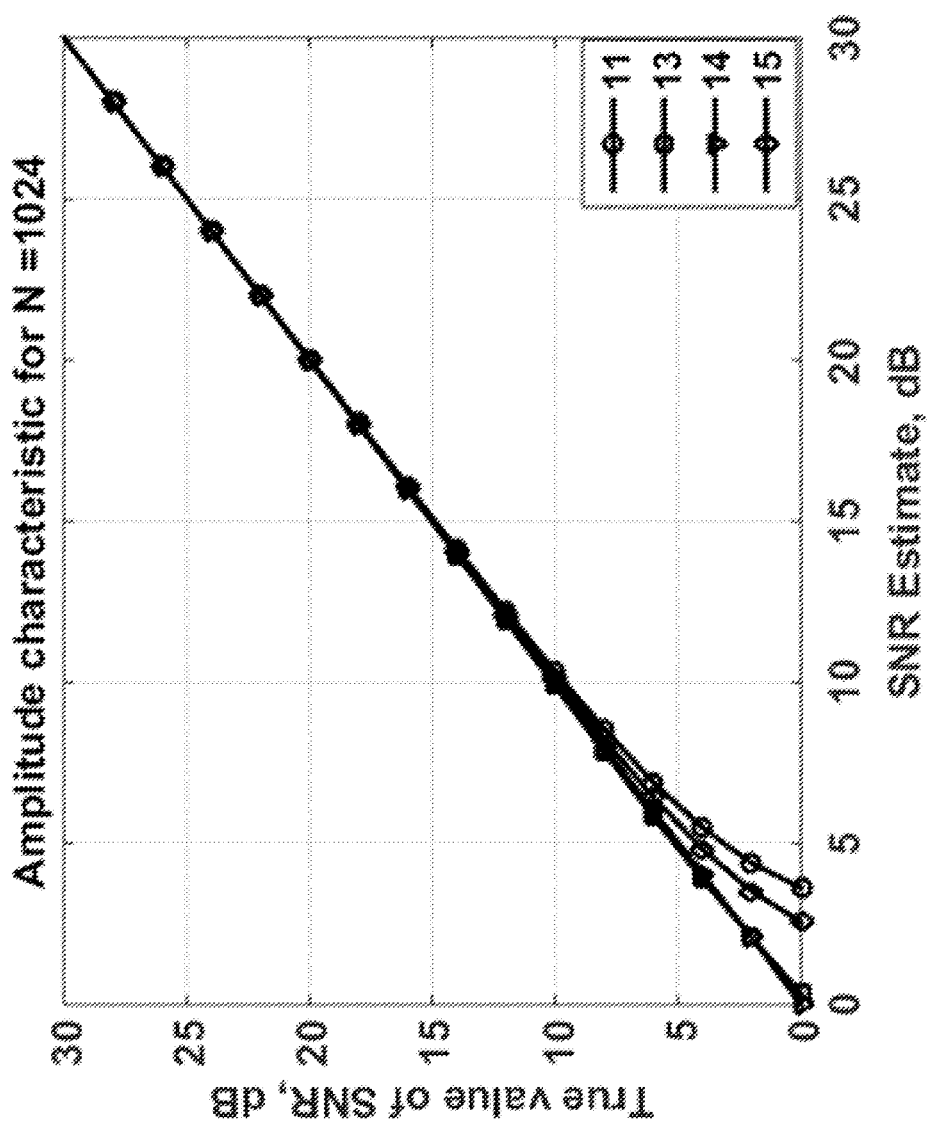
FIG. 14 shows graphs of amplitude characteristics for the offset compensation unit for other embodiments of the SNR estimation unit.

Examples of amplitude characteristics for such a non-linear element obtained from computer simulation are given for different algorithms of the SNR estimation unit (2) in FIGS. 13 and 14 for averaging by N=1023 symbols.

It should be noted that a difference between data and linear function is relatively small in comparison with the dynamic range of changing input and output variables and can result in reducing SNR estimates. Hence one needs to consider a second embodiment of the offset compensation unit (3, see FIG. 12) made as series-connected non-linear element (31), the amplitude characteristic of which matches the dependence of expected value for the deference between the true SNR and its estimate on the current SNR estimate for the given SNR estimation method, and summer (32), the second input of the summer (32) being connected to the input of the non-linear element (31); this second input is the input of the offset compensation unit (3), the output of which is the output of the summer (32).

Figure 15:
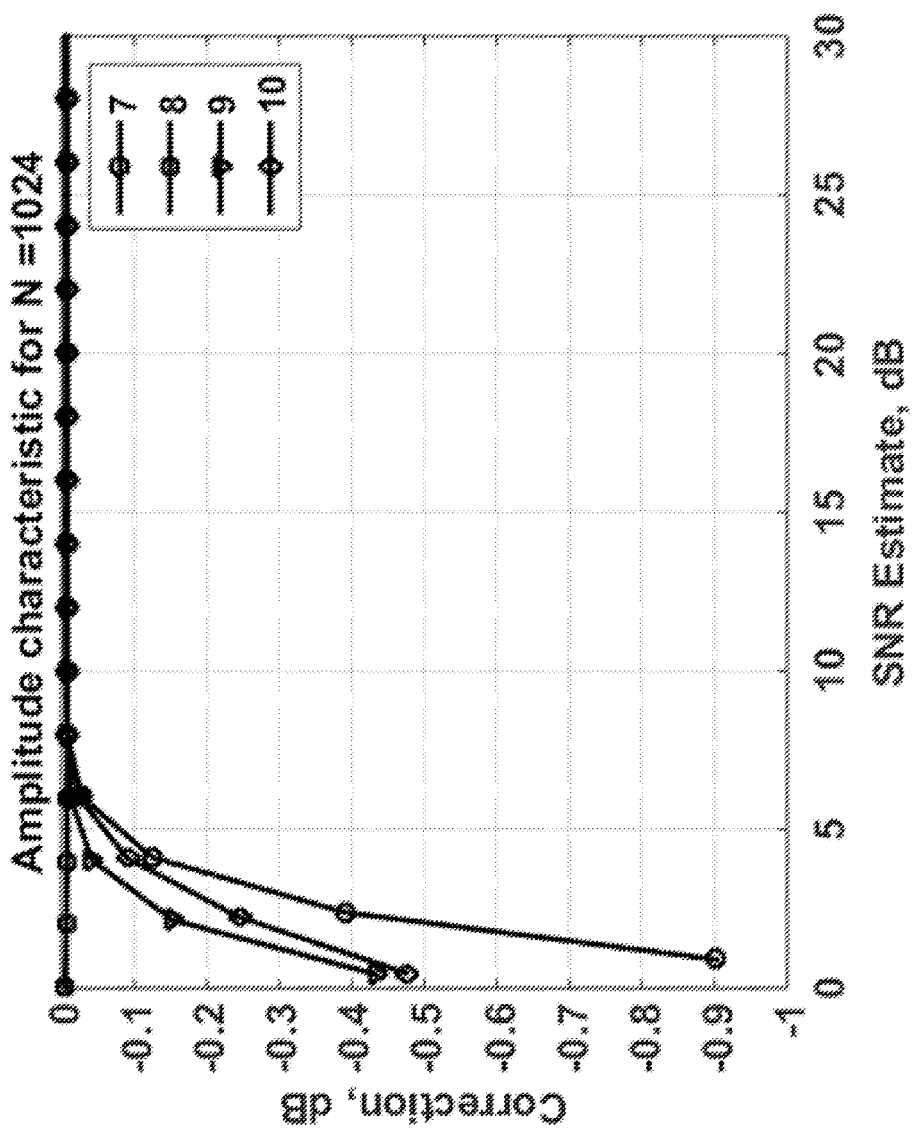
FIG. 15 shows graphs of amplitude characteristics for the non-linear element for some embodiments of the SNR estimation unit.
Figure 16:
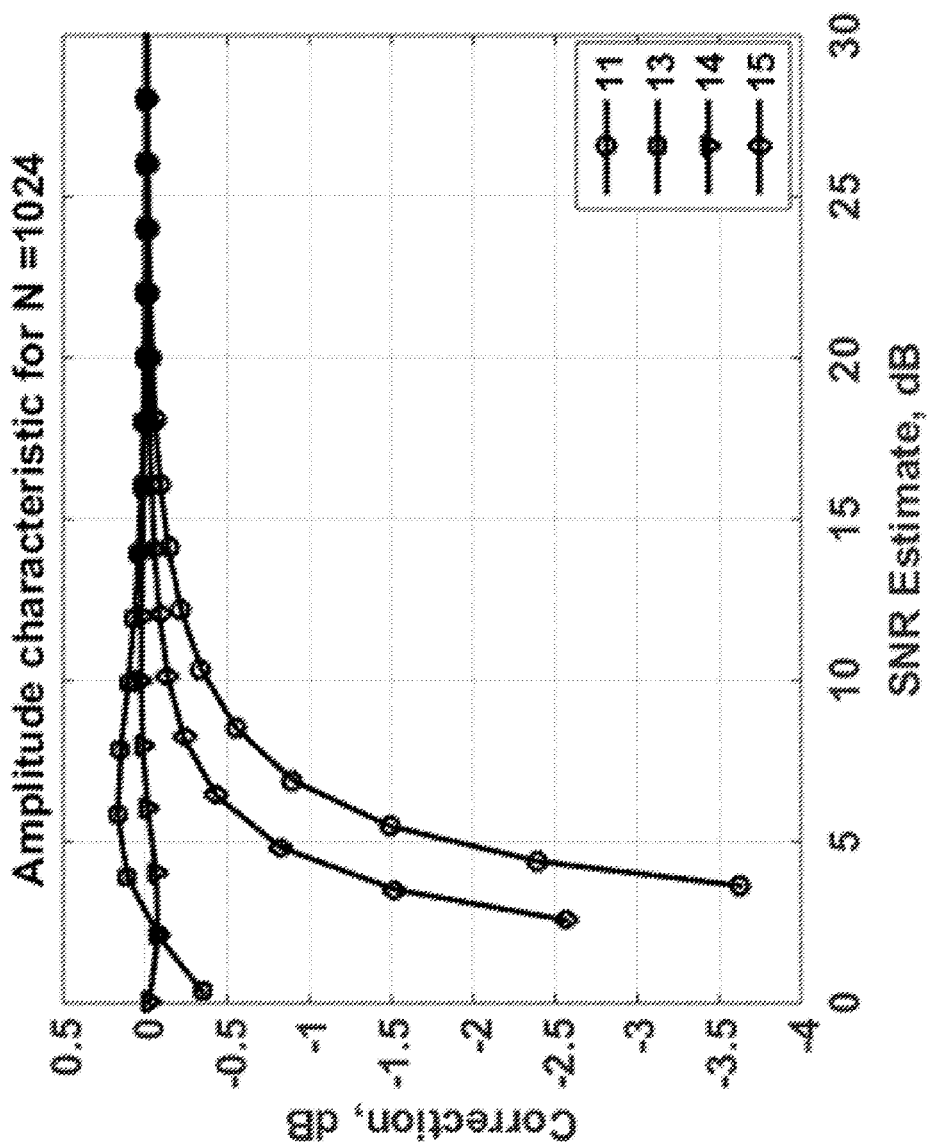
FIG. 16 shows graphs of amplitude characteristics for the non-linear element for other embodiments of the SNR estimation unit.

Some examples of amplitude characteristics of the non-linear element (31) obtained from computer simulation are given for different algorithms of functioning the SNR estimation unit (2) in FIGS. 15 and 16.

Having thus described the different embodiments of a system and method, it should be apparent to those skilled in the art that certain advantages of the described method and apparatus have been achieved. In particular, it should be appreciated by those skilled in the art that the proposed method provides for an efficient processing of payments without the use of credit or debit cards.

It should also be appreciated that various modifications, adaptations, and alternative embodiments thereof may be made within the scope and spirit of the present invention. The invention is further defined by the following claims.

What is claimed is:

1. A method of estimating a current signal-to-noise ratio (SNR), the method comprising:
receiving a signal representing a sequence of phase-modulated symbols with a fixed length and a phase modulation;
separating quadrature components $I_Y$ and $Q_Y$ of the signal;
calculating some or all of $\overline{I_Y^2}$, $\overline{Q_Y^2}$, $\overline{|I_Y|}^2$ and $\sqrt{I_y^2+Q_y^2}$;
calculating $\overline{|Q_Y|}^2$ where values of $Q_Y$ are averaged taking into account a sign of a received symbol;
determining the current SNR based on a combination of some of $\{\overline{I_Y^2}, \overline{Q_Y^2}\}$, $\{\overline{|I_Y|}^2, \overline{|Q_Y|}^2\}$ and/or $\sqrt{I_y^2+Q_y^2}$; and
compensating for a systematic error of the current SNR.

2. The method of claim 1, wherein the current SNR is calculated as $$SNR_{dB} = 10lg\left(\frac{\overline{|I_Y|}^2 + \overline{|Q_Y|}^2}{\overline{I_Y^2} + \overline{Q_Y^2} - (\overline{|I_Y|}^2 + \overline{|Q_Y|}^2)}\right).$$

3. The method of claim 1, wherein the current SNR is calculated as $$SNR_{dB} = 10lg\left(\frac{\overline{I_Y^2} - \overline{Q_Y^2} + 2\overline{|Q_Y|}^2}{2\cdot(\overline{Q_Y^2} - \overline{|Q_Y|}^2)}\right).$$

4. The method of claim 1, wherein the current SNR is calculated as $$SNR_{dB} = 10lg\left(\frac{\overline{|I_Y|}^2 + \overline{|Q_Y|}^2}{2\cdot(\overline{Q_Y^2} - \overline{|Q_Y|}^2)}\right).$$

5. The method of claim 1, wherein the current SNR is calculated as $$SNR_{dB} = 10lg\left(\frac{\overline{I_Y^2} - \overline{Q_Y^2} + 2\overline{|Q_Y|}^2}{\overline{I_Y^2} + \overline{Q_Y^2} - (\overline{|I_Y|}^2 + \overline{|Q_Y|}^2)}\right).$$

6. The method of claim 1, wherein the current SNR is calculated as $$SNR_{dB} = 10lg\left(\frac{\overline{\sqrt{I_y^2 + Q_y^2}}^2}{2\cdot\left(\overline{\sqrt{I_y^2 + Q_y^2}}^2 - \overline{\sqrt{I_y^2 + Q_y^2}}^2\right)}\right).$$

7. The method of claim 1, wherein the current SNR is calculated as $$SNR_{dB} = 10lg\left(\frac{\overline{\sqrt{I_y^2 + Q_y^2}}^2}{2\cdot\left(\overline{\sqrt{I_y^2 + Q_y^2}}^2 - \overline{\sqrt{I_y^2 + Q_y^2}}^2\right)}\right) - SNR_{add},$$

where $SNR_{add}$ is a correction to increase SNR accuracy.

8. The method of claim 7, wherein $SNR_{add}$ is calculated as $$SNR_{add} = 4\sim(\overline{x^2} - \overline{x}^2)\cdot\ln(10), \text{ where } x=|\overline{Y}|=\sqrt{I_Y^2+Q_Y^2}.$$

9. The method of claim 7, wherein $SNR_{add}$ is calculated as $$SNR_{add} = 10\cdot lg\left[(1 + 2\cdot(\overline{x^2} - \overline{x}^2))\cdot\right.$$
$$\left.\left[4.7 - \frac{3}{\overline{x^2}} + 4.5\cdot\left[\frac{\overline{x}\cdot\sqrt{\overline{x^2}}}{2\cdot\overline{x}^3} - 1\right]lg\left(\frac{2\cdot\sqrt{0.1 + \overline{x^2}} - \overline{x}^2}{1.1 + \overline{x^2}}\right)\right]\right],$$

where $x=|\overline{Y}|=\sqrt{I_Y^2+Q_Y^2}$.

10. The method of claim 1, wherein the current SNR is calculated as $$SNR_{dB} = 10lg\left(\frac{\overline{\sqrt{I_y^2 + Q_y^2}}^2}{2\left(\overline{\sqrt{I_y^2 + Q_y^2}}^2 - \overline{\sqrt{I_y^2 + Q_y^2}}^2\right)} - 1\right).$$

11. The method of claim 1, wherein $]Q_Y[$ takes into account the sign of the received symbol and is determined based on a sign of $I_Y$ and using $]Q_Y[=Q_Y\cdot\text{sign}(I_Y)$.

12. An apparatus for estimating a current signal-to-noise ratio (SNR) of a signal, the apparatus comprising:
an SNR estimator and an offset compensator connected in series, the offset compensator outputting the current SNR;
the SNR estimator including
(i) an absolute value calculator, a first mean unit, a first squaring unit, a first summer, a divider, and a decibel (dB)-recalculator, all connected in series;
(ii) a sign determination unit, a multiplier, a second mean unit, and a second squaring unit, all connected in series;
(iii) a third squaring unit, a third mean unit, a second summer and a subtractor, all connected in series,
(iv) the SNR estimator including a fourth squaring unit and a fourth mean unit, connected in series,
wherein an output of the second squaring unit is connected to the first summer,
wherein the subtractor receives an input from the first summer and outputs to the divider, and
wherein the second summer inputs an output of the fourth mean unit
the absolute value unit, the sign determination unit and the third squaring unit inputting an I component of the signal; and
the fourth squaring unit and the multiplier inputting a Q component of the signal.

13. The apparatus of claim 12, further comprising a quadrature mixer producing the I and Q components of the signal.

14. The apparatus of claim 12, wherein the offset compensator adds a non-linear correction to an output of the SNR estimator.

15. An apparatus for estimating a current signal-to-noise ratio (SNR) of a signal, the apparatus comprising:
an SNR estimator and an offset compensator connected in series, the offset compensator outputting the current SNR;
the SNR estimator including
(i) a first squaring unit, a summer, a square root unit, a first mean unit, a first subtractor, a scaling unit, a divider, a second subtractor and a decibel (dB)-recalculator, all connected in series,
wherein an output of the second squaring unit is also connected to the divider;
(ii) a third squaring unit connected to the first summer, and a second mean unit connected to an output of the summer at its input and to the subtractor at its output;
(iii) a correction calculator connected to the square root unit and to the second subtractor;
the first squaring unit inputting an I component of the signal; and
the second squaring unit inputting a Q component of the signal.

16. An apparatus for estimating a current signal-to-noise ratio (SNR) of a signal, the apparatus comprising:
  an SNR estimator and an offset compensator connected in series, the offset compensator outputting the current SNR;
  the SNR estimator including
  (i) a first squaring unit, a first mean unit, a first subtractor, a summer, a divider, and a decibel (dB)-recalculator, all connected in series,
  (ii) a second squaring unit and a second mean unit, connected in series,
    wherein an output of the second mean unit is connected to the first subtractor;
  (iii) a sign determination unit, a multiplier, a third mean unit, a third squaring unit, and a first scaling unit, all connected in series,
    wherein an output of the first scaling unit is connected to the summer,
  (iv) a second subtractor and a second scaling unit, connected in series,
  wherein
  an output of the second scaling unit is connected to the divider,
  a first input of the second subtractor is connected to an output of the second mean unit,
  a second input of the second subtractor is connected to an output of the third squaring unit,
  the first squaring unit and the sign determination unit inputting an I component of the signal, and
  the second squaring unit and the multiplier inputting a Q component of the signal.

17. An apparatus for estimating a current signal-to-noise ratio (SNR) of a signal, the apparatus comprising:
  an SNR estimator and an offset compensator connected in series, the offset compensator outputting the current SNR;
  the SNR estimator including
  (i) an absolute value unit, a first mean unit, a first squaring unit, a summer, a divider and a decibel (dB)-recalculator, all connected in series,
  (ii) a sign determination unit, a multiplier, a second mean unit, a second squaring unit, a subtractor and a scaling unit, all connected in series,
    wherein an output of the second squaring unit is connected to a second input of the summer, and
    wherein an output of the scaling unit is connected to the divider;
  (iii) a third squaring unit and a third mean unit, connected in series,
  wherein
  an output of the third mean unit is connected to a first input of the subtractor, and
  the absolute value unit and the sign determination unit receive an I component of the signal as input,
  the third squaring unit and the multiplier receive a Q component of the signal as input.

18. An apparatus for estimating a current signal-to-noise ratio (SNR) of a signal, the apparatus comprising:
  an SNR estimator and an offset compensator connected in series, the offset compensator outputting the current SNR;
  the SNR estimator including
  (i) an absolute value unit, a first mean unit, a first squaring unit, a first summer, a first subtractor, a divider and a decibel (dB)-recalculator, all connected in series;
  (ii) second squaring unit, a second mean unit, a second subtractor, and a second summer, all connected in series,
    wherein an output of the second summer is connected to the divider;
  (iii) a third squaring unit, a third mean unit and a third summer, connected in series,
    wherein an output of the third summer is connected to the first subtractor, and
    wherein an output of the third mean unit is connected to the second subtractor;
  (iv) a sign determination unit, a multiplier, a fourth mean unit, a fourth squaring unit and a scaling unit, all connected in series,
  wherein
  an output of the scaling unit is connected to the second summer,
  an output of the fourth squaring unit is also connected to the first summer,
  the absolute value unit, the second squaring unit and the sign determination unit receive an I component of the signal as input, and
  the third squaring unit and the multiplier receive a Q component of the signal as input.

19. An apparatus for estimating a current signal-to-noise ratio (SNR) of a signal, the apparatus comprising:
  an SNR estimator and an offset compensator connected in series, the offset compensator outputting the current SNR;
  the SNR estimator including
  (i) a first squaring unit, a summer, a square-root unit, a first mean unit, a second squaring unit, a divider, a scaling unit and a decibel (dB)-recalculator, all connected in series;
  (ii) a third squaring unit connected to the summer; and
  (iii) a second mean unit and a subtractor, connected in series,
  wherein
  the first squaring unit inputs an I component of the signal,
  the third squaring unit inputs an Q component of the signal,
  an output of the third squaring unit is connected to the summer,
  an output of the second squaring unit is connected to the subtractor, and
  an output of the subtractor is connected to the divider.

* * * * *